United States Patent
Drzaic et al.

(10) Patent No.: US 10,453,375 B2
(45) Date of Patent: Oct. 22, 2019

(54) LONG-TERM HISTORY OF DISPLAY INTENSITIES

(71) Applicant: Apple Inc., Cupertino, CA (US)

(72) Inventors: Paul S. Drzaic, Morgan Hill, CA (US); Tae-Wook Koh, Los Gatos, CA (US); Ross Thompson, Los Gatos, CA (US); Guy Cote, Aptos, CA (US); Christopher P. Tann, San Jose, CA (US); Jerrold V. Hauck, Windermere, FL (US); Yifan Zhang, San Carlos, CA (US); Jean-Pierre Guillou, Los Gatos, CA (US); Ian C. Hendry, San Jose, CA (US); Vanessa C. Heppolette, Palo Alto, CA (US); Arthur L. Spence, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/874,791

(22) Filed: Jan. 18, 2018

(65) Prior Publication Data
US 2018/0350295 A1    Dec. 6, 2018

Related U.S. Application Data

(60) Provisional application No. 62/556,376, filed on Sep. 9, 2017, provisional application No. 62/514,939, filed on Jun. 4, 2017.

(51) Int. Cl.
*G09G 3/00*   (2006.01)
*G09G 3/20*   (2006.01)
(Continued)

(52) U.S. Cl.
CPC ........... *G09G 3/2003* (2013.01); *G06F 3/067* (2013.01); *G06F 3/0622* (2013.01);
(Continued)

(58) Field of Classification Search
CPC ..... G09G 2320/0233; G09G 2320/046; G09G 2360/16; G06F 3/0622; G06F 3/0623; G06F 3/0652; G06F 3/0656
See application file for complete search history.

(56) References Cited

U.S. PATENT DOCUMENTS 6,094,639 A    7/2000   Kubota
6,995,519 B2   2/2006   Arnold et al.
(Continued)

FOREIGN PATENT DOCUMENTS

JP    2009093098 A    4/2009
KR    20150078357 A    7/2015

OTHER PUBLICATIONS

PCT International Search Report and The Written Opinion of the International Searching Authority for PCT/US2018/015485 dated Jul. 9, 2018.
(Continued)

*Primary Examiner* — Antonio A Caschera
(74) *Attorney, Agent, or Firm* — Womble Bond Dickinson (US) LLP

(57) ABSTRACT

A data processing system can store a long-term history of pixel luminance values in a secure memory and use those values to create burn-in compensation values that are used to mitigate burn-in effect on a display. The long-term history can be updated over time with new, accumulated pixel luminance values.

18 Claims, 15 Drawing Sheets

(51) Int. Cl.

| | |
|---|---|
| G06F 3/06 | (2006.01) |
| G09G 3/3208 | (2016.01) |
| G06F 9/4401 | (2018.01) |
| G09G 3/32 | (2016.01) |
| G06F 9/451 | (2018.01) |

(52) U.S. Cl.
CPC .......... *G06F 3/0623* (2013.01); *G06F 3/0643* (2013.01); *G06F 3/0644* (2013.01); *G06F 3/0647* (2013.01); *G06F 3/0652* (2013.01); *G06F 3/0656* (2013.01); *G06F 3/0673* (2013.01); *G06F 9/4401* (2013.01); *G06F 9/451* (2018.02); *G09G 3/006* (2013.01); *G09G 3/32* (2013.01); *G09G 3/3208* (2013.01); *G09G 2300/0847* (2013.01); *G09G 2320/0233* (2013.01); *G09G 2320/0285* (2013.01); *G09G 2320/043* (2013.01); *G09G 2320/046* (2013.01); *G09G 2320/048* (2013.01); *G09G 2320/066* (2013.01); *G09G 2330/026* (2013.01); *G09G 2354/00* (2013.01); *G09G 2358/00* (2013.01)

(56) References Cited

U.S. PATENT DOCUMENTS

| | | |
|---|---|---|
| 2002/0033783 A1 | 3/2002 | Koyama |
| 2003/0071804 A1 | 4/2003 | Yamazaki et al. |
| 2005/0280766 A1 | 12/2005 | Johnson et al. |
| 2007/0146385 A1* | 6/2007 | Kienhoefer .............. G09G 3/22 345/593 |
| 2010/0037092 A1 | 2/2010 | Zamora |
| 2010/0067706 A1* | 3/2010 | Anan .................... G06F 21/608 380/285 |
| 2011/0074806 A1* | 3/2011 | Chen ........................ G09G 3/20 345/589 |
| 2011/0227964 A1 | 9/2011 | Chaji et al. |
| 2014/0089682 A1 | 3/2014 | Gulati et al. |
| 2014/0232409 A1 | 8/2014 | Keum |
| 2016/0293102 A1 | 10/2016 | Chaji |
| 2016/0344990 A1 | 11/2016 | Kozuka et al. |
| 2016/0351094 A1 | 12/2016 | Chaji |
| 2017/0076661 A1 | 3/2017 | Zhang et al. |
| 2017/0223367 A1 | 8/2017 | Stessen |
| 2017/0358063 A1 | 12/2017 | Chen et al. |
| 2018/0005598 A1 | 1/2018 | Kambhatia |

OTHER PUBLICATIONS

P. Volkert, X. Jiang, and C. Xu, "Characterization and Compensation of OLED Aging in a Digital AMOLED System," J. Soc. Info. Display, vol. 23, Issue 12, pp. 570-579 (Dec. 2015), DOI:10.1002/jsid.401.

PCT Invitation To Pay Additional Fees And, Where Applicable, Protest Fee, for PCT/US2018/015485 dated Apr. 24, 2018.

* cited by examiner

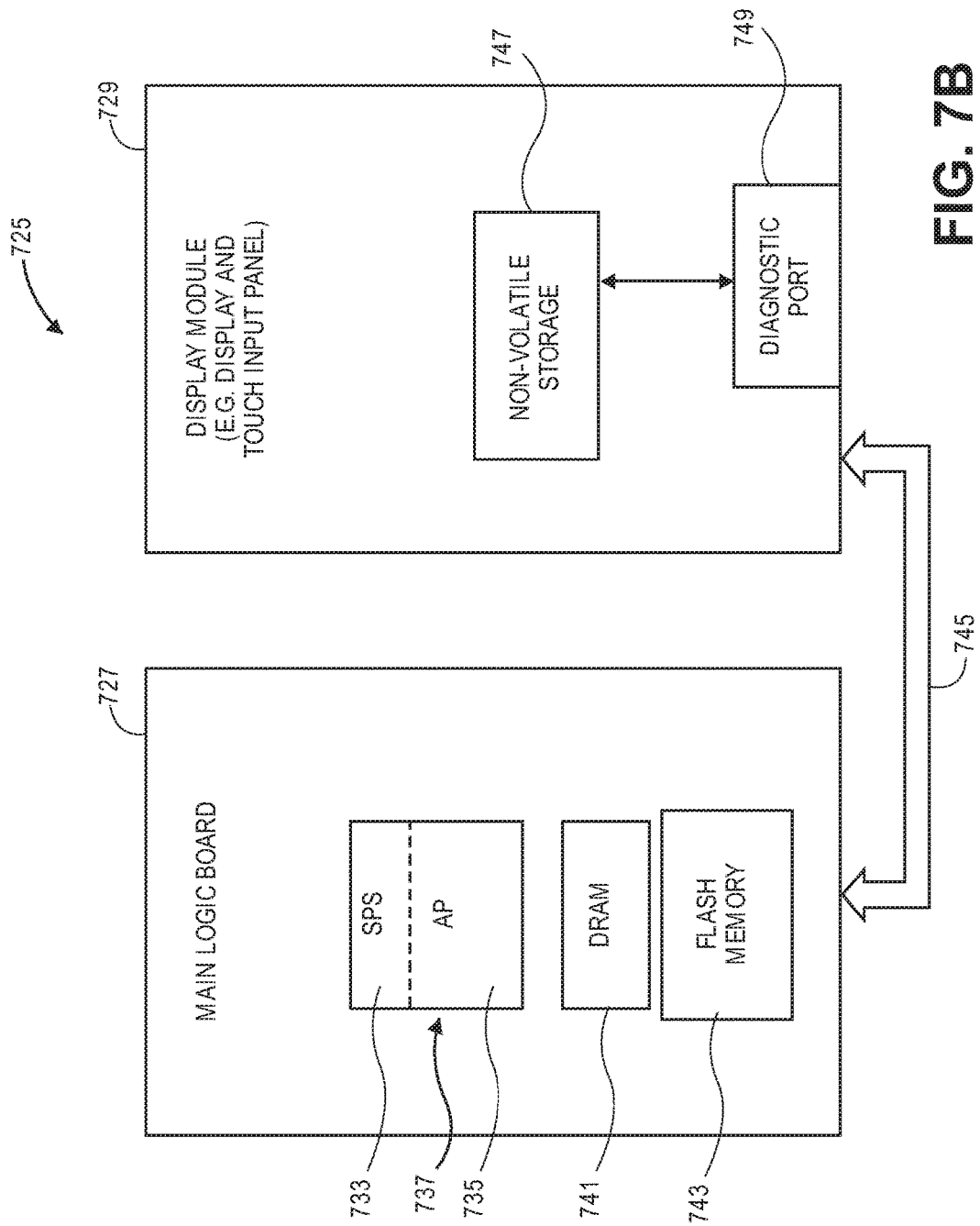

(R or G or B)

(R, G or B)

LONG-TERM HISTORY OF DISPLAY INTENSITIES

This application claims the benefit of U.S. Provisional Patent Application No. 62/556,376, filed on Sep. 9, 2017, and U.S. Provisional Patent Application No. 62/514,939, filed on Jun. 4, 2017, both of which are incorporated herein by reference.

BACKGROUND

The embodiments described herein relate generally to data processing systems that include a display and more particularly to systems that compensate or adjust display values that are used to drive a display.

Displays, such as light emitting diode (LED) displays, can degrade over time as the display is used to show images on the display. LED displays and other types of displays typically include individually controlled pixels that can be used differently over time. These pixels emit light to display images to a user, and the light emitting structures in the pixels may be subject to aging effects. As a result, pixel luminance can drop over time; this drop in pixel luminance can be referred to as a burn-in effect. The pixels on a display that, over time, have emitted low luminance light levels may have a lower burn-in effect than other pixels on the display that, over the same time, have emitted high luminance light levels. In other words, for different pixels on the same display, some pixels can have a high burn-in effect while other pixels can have a low burn-in effect. This generally means that the pixels with the high burn-in effect output lower luminance levels at a given input value than the pixels with the low burn-in effect. Moreover, in color displays, sub-pixels of different colors can age differently which can lead to potential color shifts over time. As a result, attempts have been made to compensate for burn-in effect; see, for example, P. Volkert, X. Jiang, and C. Xu, "Characterization and Compensation of OLED Aging in a Digital AMOLED System," J. Soc. Info. Display, Vol. 23, Issue 12, pages 570-579 (December 2015), DOI:10.1002/jsid.401.

SUMMARY OF THE DESCRIPTION

In one embodiment, a data processing system, that may include a display (e.g. an LED or OLED display), can derive compensation values to compensate for burn-in effect on the display by deriving the compensation values from a long-term history of display intensity values, wherein the long-term history (LTH) is stored in secure memory in a secure processing system. In this embodiment, the data processing system can perform a method that includes the following operations: storing a plurality of snapshots, taken over time, of data representing display intensity (e.g., data representing luminance levels for sub-pixels in a pixel) for each pixel in a plurality of pixels in the display; and accumulating the data representing display intensity for each pixel in a long-term history stored in a memory (e.g. volatile DRAM—dynamic random access memory) within a secure enclave of a secure processing system. The long-term history can store, for each pixel in the plurality of pixels, a long-term display intensity. In one embodiment, the long-term history can also include long-term information about operating temperature of the display. In one embodiment, the plurality of pixels can include all of the pixels in the display, while in another embodiment (which may employ a pixel smoothing or averaging approximation across adjacent pixels) the plurality of pixels can be less than all of the pixels. In one embodiment, an accumulation buffer (e.g. in DRAM in an application processing system) can accumulate multiple snapshots of display intensities and then add accumulated values from those multiple snapshots to the long-term buffer in memory, such as secure memory in a secure processing system.

Each of the snapshots can be captured and stored once per first time period and the accumulation buffer can be flushed once per second time period, which can be several times greater than the first time period. The accumulation buffer can be used to accumulate a set of snapshots before adding the accumulated value from the set of snapshots to the long-term history, which can reduce the number of wake-ups from sleep or low-power state for the secure processing system during the second time period. In one embodiment, the long-term history can provide a long-term display intensity for each pixel of the display over the entire lifetime of the display. In one embodiment, the secure processing system has one or more private keys and one or more device identifiers stored in secure memory in the secure processing system, and these keys and identifiers are not accessible to an application processing system that is coupled to the secure processing system. In one embodiment, the secure processing system can verify code signatures at boot up time of the data processing system and can verify user passcodes to unlock the data processing system from a locked state.

In one embodiment, a data processing system can include: a frame buffer to store image data for display on a display device; a display device having a plurality of pixels, the display device coupled to the frame buffer; a first memory to store a plurality of snapshots, taken over time, of data representing pixel intensity or display intensity for each pixel in the plurality of pixels; a second memory to store an accumulation buffer that stores an accumulated value for each pixel in the plurality of pixels, each accumulated value derived by accumulating the display intensities from the plurality of snapshots for each pixel; a first processing system coupled to the frame buffer and to the first memory and to the second memory, the first processing system configured to accumulate the display intensities from the plurality of snapshots; and a second processing system coupled to the first processing system, the second processing system including a secure memory, wherein the second processing system is configured to add the accumulated value for each pixel in the plurality of pixels to a long-term history stored in the secure memory after the first processing system flushes the accumulated value for each pixel in the plurality of pixels to the long-term history which stores, for each pixel in the plurality of pixels, a long-term display intensity. In one embodiment, the plurality of pixels in the display includes all of the plurality of pixels in the display that are used to display one or more images on the display.

According to another aspect of the embodiments described herein, a data processing system can perform a method which includes the following operations: storing a long-term history in a secure memory in a secure processing system, the long-term history storing for each pixel in a plurality of pixels in a display, a value representing a long-term display intensity; encrypting, by the secure processing system for each pixel in the plurality of pixels, a long-term history to create an encrypted long-term history; and transmitting the encrypted long-term history from memory in the secure processing system to a non-volatile storage managed by a file system maintained by an application processing system. In one embodiment, the file system maintains user files in a first partition in the non-volatile storage. In one embodiment, the method can further include compressing and encrypting, by the secure processing system, the long-term history to create a compressed and encrypted long-term history; and transmitting the compressed and encrypted long-term history to a second non-volatile storage maintained by the application processing system. In one embodiment, the encrypted long-term history is stored in the first partition and is a primary backup of the long-term history and is used at boot up of the data processing system to read the long-term history from the first partition into memory in the secure processing system. The compressed and encrypted long-term history can be compressed with a lossy (or lossless) compression algorithm and can be a secondary backup of the long-term history that is used at boot up of the data processing system when the primary backup fails. In one embodiment, the encrypted long-term history and the compressed and encrypted long-term history can be associated with the display identifier that uniquely identifies the display that generated the data that created the long-term history. In one embodiment, the method can further include uploading the compressed and encrypted long-term history to a user's private cloud archive storage account. In one embodiment, the method can further include transmitting, during boot up of the data processing system, the encrypted long-term history from the non-volatile storage managed by the file system to memory in the secure processing system and then decrypting, by the secure processing system, the encrypted long-term history to obtain the long-term display intensity for each pixel; generating, for each pixel, a compensation value based on the long-term display intensity for each pixel, the compensation value to mitigate a burn-in effect on the display; transmitting, from the secure processing system to the application processing system, the compensation value for each pixel for use in compensating for burn-in effect on the display. In one embodiment, the method can further include: generating, by the application processing system, a downsampled set of compensation values from at least a subset of a set of data that includes the compensation value for each pixel in the plurality of pixels in the display; storing, by the application processing system, the downsampled set of compensation values in non-volatile storage for use in compensating for burn-in effect on the display during at least a portion of the boot up of the data processing system. The downsampled set of compensation values can be used during at least an initial portion of the boot up of the data processing system to compensate for burn-in effect during at least the initial portion of the boot up, and thereafter the burn-in effect can be compensated for using the compensation value for each pixel derived from the long-term history.

Another aspect of the embodiments described herein relates to the creation and use of a metric which indicates a generalized long-term display intensity for the display. The metric can be for the entire display or multiple metrics can indicate long-term display intensities for multiple portions of the display. In an embodiment according to this aspect, a data processing system can perform a method which includes the following operations: storing a long-term history which stores, for each pixel in a plurality of pixels in a display, a long-term display intensity; generating for each pixel, a compensation value based on the long-term display intensity for each pixel, the compensation value to mitigate a burn-in effect on the display; generating a metric representing display usage based on the long-term history for at least a subset of the plurality of pixels in the display, the metric indicating a generalized long-term display intensity for at least a portion of the display; and storing the metric in a non-volatile storage. In one embodiment, the non-volatile storage is in a module that is separable from a main logic board that includes a system DRAM (dynamic random access memory) and an application processing system. In one embodiment, the module is part of a display module that includes the display, and the display module is configured to be coupled to a replacement main logic board if the main logic board is replaced. In one embodiment, the non-volatile storage which stores the metric is readable for diagnostic evaluation when the main logic board is replaced. In one embodiment, the non-volatile storage includes data or instructions for use by a touch input panel. In one embodiment, the metric provides no spatially related information from which an image can be derived, and the metric can be based on a subset of pixels. In one embodiment, the long-term history is stored in a secure memory in a secure processing system which generates the metric and transmits the metric to an application processing system which stores the metric in the non-volatile storage, such as the non-volatile storage in a display module that is separable from the main logic board, and the non-volatile storage can be readable for diagnostic evaluation when the main logic board is replaced.

Another embodiment which creates and uses a metric (that indicates a generalized long-term display intensity for a display) uses a set of metrics, each metric in the set being for a portion of the display. A method according to this embodiment can include the following operations: storing a long-term history which stores, for each pixel in a plurality of pixels in the display, a long-term display intensity; generating a plurality of first region metrics for a corresponding plurality of first regions, each first region metric representing display usage based on the long-term history for pixels in a corresponding one of the first regions, the first regions spanning at least a first portion of the display; and transmitting the plurality of first region metrics to a developer of either software or hardware of the system that includes the display. Each region can be considered a tile or region or portion of the display and can include the pixels in that tile or portion. In one embodiment, the plurality of first regions can be a grid of rectangular regions that covers the entire display. In another embodiment, the plurality of first regions can be a set of regions that cover only a portion of the display. The regions can be selectively located, in one embodiment, at anticipated locations on the display where there is a high likelihood that display intensities may be high or in locations where there is a high likelihood that display intensities may have a high contrast (e.g., a region of the display which includes a dark set of pixels for a divider line and an adjacent region that includes bright pixels next to the divider line). In one embodiment, these one or more regions or tiles that are selectively located can overlap with a grid of tiles that cover the entire display. In one embodiment, the transmission of the plurality of first region metrics to a developer allows the developer to develop future products or modifications of existing products based on the metrics. For example, the plurality of first region metrics can be analyzed by the developer to determine whether existing burn-in mitigations (using, for example, existing algorithms that generate burn-in compensation values) are sufficient or need to be modified to improve the existing burn-in mitigations. The plurality of first region metrics can also be analyzed by the developer to determine whether certain user interface (UI) elements (such as those UI elements that are frequently displayed and include regions of high display intensity contrast) should be modified to reduce a burn-in effect that is not sufficiently mitigated. In one embodiment, the transmission of the plurality of first region metrics occurs in response to (or only after) the user provides permission to the developer to gather information about the user's data processing system; in one embodiment, the source (e.g. identifier of user) of the plurality of first region metrics is anonymized so that the developer cannot identify the user or user's data processing system.

Another aspect of the embodiments described herein relates to the use of a metric derived from accumulating a set of long-term display intensity values during display of content having an extended or high dynamic range relative to a standard dynamic range. In an embodiment of this aspect, a data processing system can perform a method which includes the following operations: compensating, for each pixel during display of content having a first dynamic range, for burn-in effect on a display using a compensation value for each pixel, the compensation value derived from a long-term history that stores, for each pixel in a plurality of pixels on a display, a long-term display intensity; detecting display of content having a second dynamic range that exceeds the first dynamic range, the content displayed by a first application program; determining an available headroom for display intensities above the first dynamic range based on a metric derived from accumulating a set of long-term display intensity values during display of content having the second dynamic range; and limiting maximum display intensities during display of content by the first application program based on the determined available headroom. In one embodiment, the compensating for burn-in effect using the compensation value for each pixel is also performed during display of content having the second dynamic range. In one embodiment, the second dynamic range can be a high dynamic range in which luminance values can vary in a range which is 100 or a 1,000 times more than the first dynamic range.

The methods and systems described herein can be implemented by data processing systems, such as smart phones, tablet computers, desktop computers, laptop computers, server systems, and other data processing systems, and other consumer electronic devices. The methods and systems described herein can also be implemented by one or more data processing systems which execute executable computer program instructions, stored on one or more non-transitory machine readable media that cause the one or more data processing systems to perform the one or more methods described herein when the program instructions are executed. Thus, the embodiments described herein can include methods, data processing systems, and non-transitory machine readable media.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIG. 7B shows an example of a system which includes a main logic board and a display module which are separable, thereby allowing the replacement of either the main logic board or the display module depending on the state of the components.

DETAILED DESCRIPTION

Figure 1:
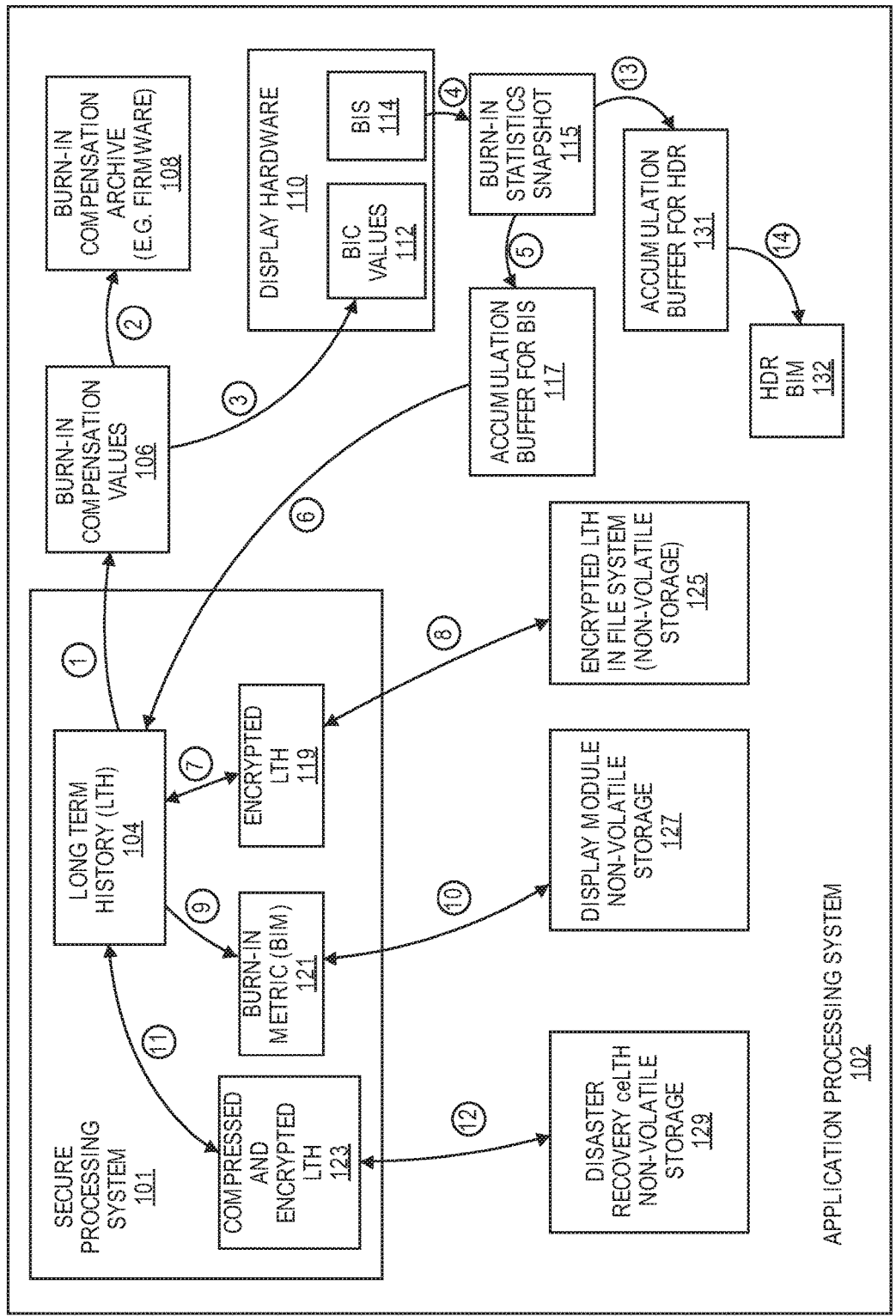
FIG. 1 shows an example of a set of data structures which store data in different parts of a data processing system.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

As a result of aging of pixels due to use over the lifetime of a display, the light producing capabilities of the light emitting devices in the pixels of the display may degrade over time. To ensure that images are appropriately displayed on the display, aging history information, such as a long-term history can be stored in the device for each of the pixels in a plurality of the pixels in the display. In one embodiment, a long-term history value for each pixel in the display is stored in the long-term history; in an alternative embodiment, a subset of all of the pixels, such as clusters of adjacent pixels, such as 2×2 blocks of pixels, etc. can be used to store information about each cluster of pixels. The long-term history information may also take into account, in certain embodiments, not only the luminance history of each pixel of the plurality of pixels, but also the operating temperature information for the display. A pixel luminance degradation compensator can use the compensation values to apply the compensation values to uncorrected pixel luminance values associated with frames of image data to produce corresponding corrected pixel luminance values for display to the user. The emissive material within each pixel may degrade as the pixels are used. For example, as organic light emitting diodes are used over time, the emissive material may degrade resulting in reduced light producing capabilities of the light emitting devices in the display over time. Heavy use, in which the light emitting diodes are driven with large currents, may age the diodes more rapidly than light use in which the diodes are driven with small currents. The light emitting diodes may be driven with a continuous current, or be driven at high currents for short times in pulse width modulation mode. As the diodes age, the degraded emissive material can cause the diodes to emit a reduced amount of light for a given drive current. Different light emitting pixel colors may age at different rates depending on usage.

In another embodiment, light emitting diodes (LEDs) or micro light emitting diodes (uLEDs) may degrade with usage over time. The degradation characteristics of the LEDs or uLEDs can be complex, depending on the current density driven through the device, the time profile of driving, the material makeup of the device, and the temperature. Nevertheless, the aging characteristics of the diodes can be predicted by knowledge of the details of the electronic signals used to drive the light emitting diodes. By using burn-in compensation values, the degradation in display luminance can be compensated for or adjusted for in the one or more embodiments described herein.

FIG. 1 shows an example according to one embodiment for creating, storing, and using a long-term history (LTH) which can be used to create burn-in compensation (BIC) values which are used to mitigate a burn-in effect on a display device such as an organic light emitting diode display. FIG. 1 shows one example which includes a secure processing system 101 and an application processing system 102 which is coupled to the secure processing system 101 and is coupled to display hardware 110 which can include a display and a frame buffer and a graphics subsystem. It will be appreciated that in alternative embodiments, some of the components and data structures may not be present or there are different combinations of components or data structures in these alternative embodiments. FIG. 1 shows a set of data structures for data stored in various parts of the data processing system and also shows the flow or processes between the data in the data structures (e.g., process 1 between LTH 104 and BIC values 106). The secure processing system 101 can be similar to the secure processing system 903 shown in FIG. 9, and the application processing system 102 can be similar to the components of the application processing system shown in FIG. 9, which can include one or more application processors 921, one or more buses 923, an application processor ROM 925 and one or more input/output devices 927. The secure processing system 101 can store a long-term history 104, and the secure processing system 101 can use process 1 to create burn-in compensation values 106 which can be stored into display hardware 110 in order to create corrected pixel luminance values using the compensation values 106 during display of images on a display driven by the display hardware 110. The compensation values 106 can be stored as the BIC values 112 within display hardware 110. In one embodiment, the same storage or memory can store both BIC 106 and BIC 112 while in another embodiment, BIC 106 and BIC 112 are stored in different storage or memory (e.g., BIC 106 is in system DRAM while BIC 112 is in a graphics subsystem's DRAM).

Figure 2:
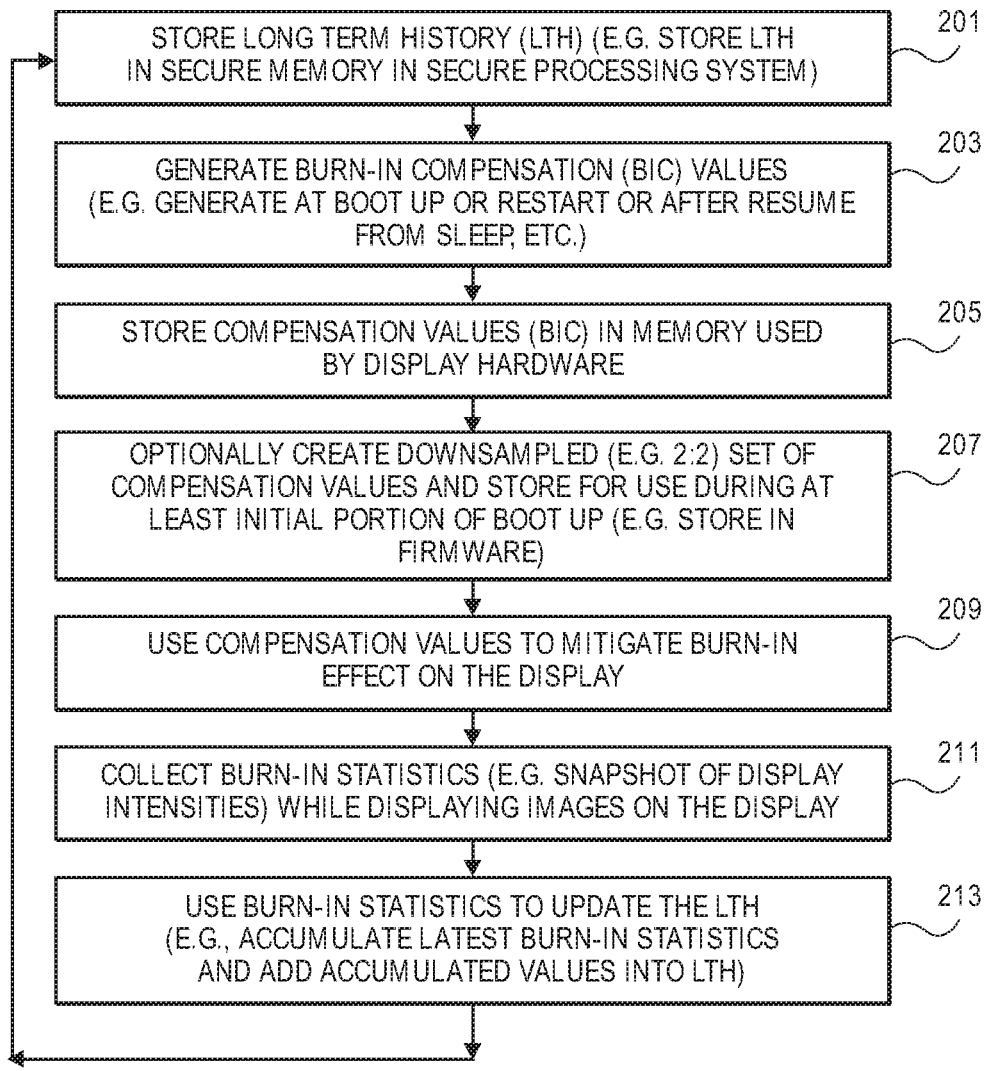
FIG. 2 is a flowchart which illustrates an overview of a method according to one embodiment described herein.

FIG. 2 shows an overview of a method which can be employed with at least a portion of the data structures shown in FIG. 1. The method of FIG. 2 can begin in operation 201 in which a long-term history is stored. In one embodiment, the long-term history can be maintained to have the same number of entries as there are pixels in the display; in another embodiment, averaged history information may be maintained for clusters of adjacent pixels, such as 2×2 blocks of pixels, etc. in which adjacent pixels share a common aging history value to conserve memory. In one embodiment, the long-term history can be stored in a secure memory in a secure processing system; in an alternative embodiment, the long-term history can be stored in memory maintained by an application processing system, such as the application processing system 102. In operation 203, burn-in compensation values are generated; this generation can occur at boot up of the data processing system or restart of the data processing system or after resuming from sleep, etc. In one embodiment, operation 203 can be performed by the secure processing system 101 which generates the burn-in compensation (BIC) values and then transmits those values to memory maintained by the application processing system 102 to become the burn-in compensation values 106 as shown in FIG. 1. In this example, process 1 involves the creation of the burn-in compensation values based upon the long-term history 104 using process 1 to create and then transmit those burn-in compensation values 106. The burn-in compensation values can be based on a model about pixel aging for different luminance levels over the lifetime of a pixel, optionally for different operating temperature levels over the lifetime of the pixels and optionally for both continuous pixel drive and for pulse width modulation drive. The model can be derived from data obtained from testing of displays in a development lab. The displays can be stress tested with different luminance levels and different temperature levels and with either continuous drive or pulse width modulation drive over time. The stress testing can be accelerated aging tests, and measurements taken over time during this stress testing produce measured luminance levels that are output from the pixels and show the effect of aging, such as reduced luminance output from the pixels. The data from these stress tests can be used to generate one or more models about pixel aging, and then compensation values can be calculated (using techniques known in the art) and stored (for example, in a table) for different levels of aging. The process 1 shown in FIG. 1 can use these compensation values for each pixel to produce the burn-in compensation values 106 based upon the long-term display intensity level stored for each pixel in the long-term history 104 in one embodiment. In the example shown in FIG. 1, the secure processing system 101 generates the burn-in compensation values from the long-term history 104 which is stored in secure memory in the secure processing system 101; in an alternative embodiment, the application processing system 102 may generate the burn-in compensation values based upon a long-term history which is stored in memory maintained by the application processing system 102 and which may not be a secure memory. Referring back to FIG. 2, in operation 205, the compensation values are stored in memory used by display hardware which is shown by process 3 which causes the storage of the burn-in compensation values into a memory 112 within the display hardware which can be a graphics subsystem. In one embodiment, the display hardware 110 can include a frame buffer and a graphics processing unit and a display device (e.g., an organic LED display or a uLED) and other hardware components that are part of a graphics subsystem as is known in the art. The burn-in compensation values 112, stored within the display hardware 110 in one embodiment, can be used to compensate for pixel input values during the display process as is known in the art. In one embodiment of the method shown in FIG. 2, the application processing system 102 can optionally create, in operation 207, a downsampled set of compensation values in process 2 and store the downsampled set of compensation values in a burn-in compensation archive 108 which can be in firmware storage that is used during boot up of the data processing system. The downsampled set of compensation values can use a cluster of adjacent pixels, such as a 2×2 cluster of adjacent pixels or other arrangements of adjacent pixels, in order to store the long-term history in a compressed but usable format to reduce storage requirements. The downsampled set of compensation values can be used during at least an initial portion of the boot up process of the data processing system. It will be appreciated that process 2 is an optional process in certain embodiments.

Referring back to FIG. 2, in operation 209 the burn-in compensation values 112 stored in memory used by the display hardware 110 are used to mitigate the burn-in effect during the display of images on a display coupled to the display hardware 110. In one embodiment, a pixel luminance degradation compensator may apply the burn-in compensation values on a pixel-by-pixel basis to correct uncorrected pixel luminance values which are supplied as inputs for each image to derive corrected pixel luminance values for display on the display device coupled to the display hardware 110. In one embodiment, the use of compensation values to mitigate the burn-in effect on the display can be performed for each and every frame of images that are displayed on the display; in an alternative embodiment, the compensation values can be used for less than all of the images displayed on the display in certain embodiments. While images are being displayed on the display, in operation 211 in FIG. 2, the system collects burn-in statistics (BIS) 114 which can be a snapshot of display intensities for each frame. These collected burn-in statistics 114 can, in process 4, be saved to memory controlled by the application processing system 102 as the burn-in statistics snapshot 115. In one embodiment, the burn-in statistics can include pixel intensity values or pixel luminance values for all pixels of the display and can also include thermal information such as temperature information which indicates an operating temperature of the display during the time frame of the snapshot. In one embodiment, a snapshot of the display intensities of the pixels on the display can be taken once every second or every two seconds or every five seconds, etc. Snapshots taken with a higher frequency will provide improved information relative to snapshots taken with a lower frequency, but higher frequency snapshots will consume more computational resources and power, than lower frequency snapshots. In one embodiment, a snapshot taken once every second can be considered a compromise between these competing concerns. In one embodiment, the snapshots may be obtained directly from data in the frame buffer or may be obtained from other data structures containing pixel luminance values for images displayed on the display. After process 4 shown in FIG. 1 collects the burn-in statistics of display intensities, these statistics can be used to update in operation 213 of FIG. 2 the long-term history, such as long-term history 104 shown in FIG. 1. In one embodiment, an accumulation buffer 117 can be used to accumulate the latest burn-in statistics through processes 5 and 6 shown in FIG. 1. In an alternative embodiment, the snapshots 115 can be directly added to the long-term history without using an accumulation buffer such as accumulation buffer 117.

Figure 3:
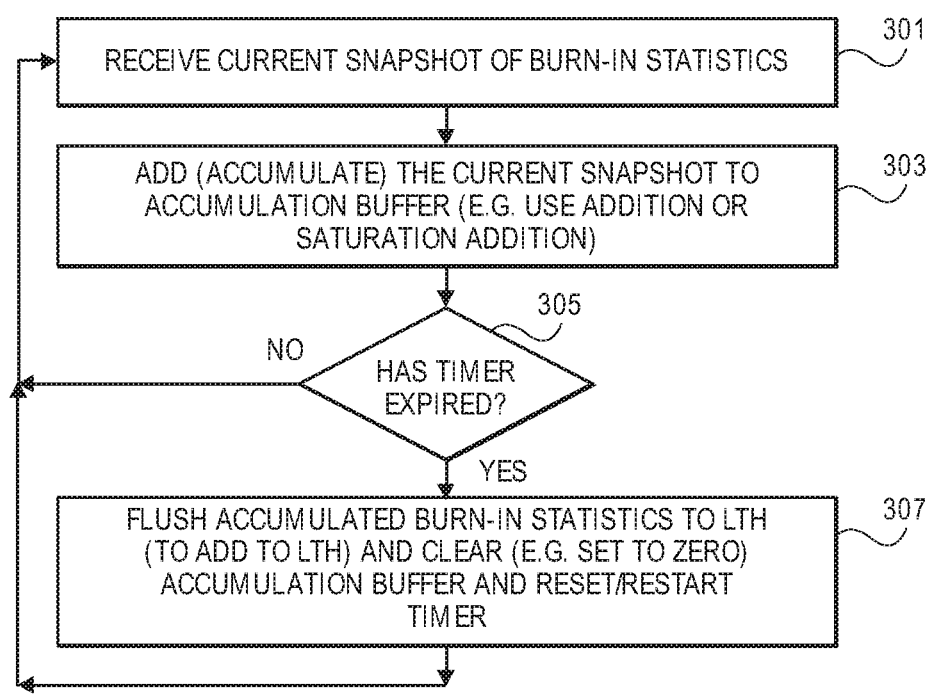
FIG. 3 is a flowchart which illustrates a method which can use an accumulation buffer according to one embodiment described herein.
Figure 4:
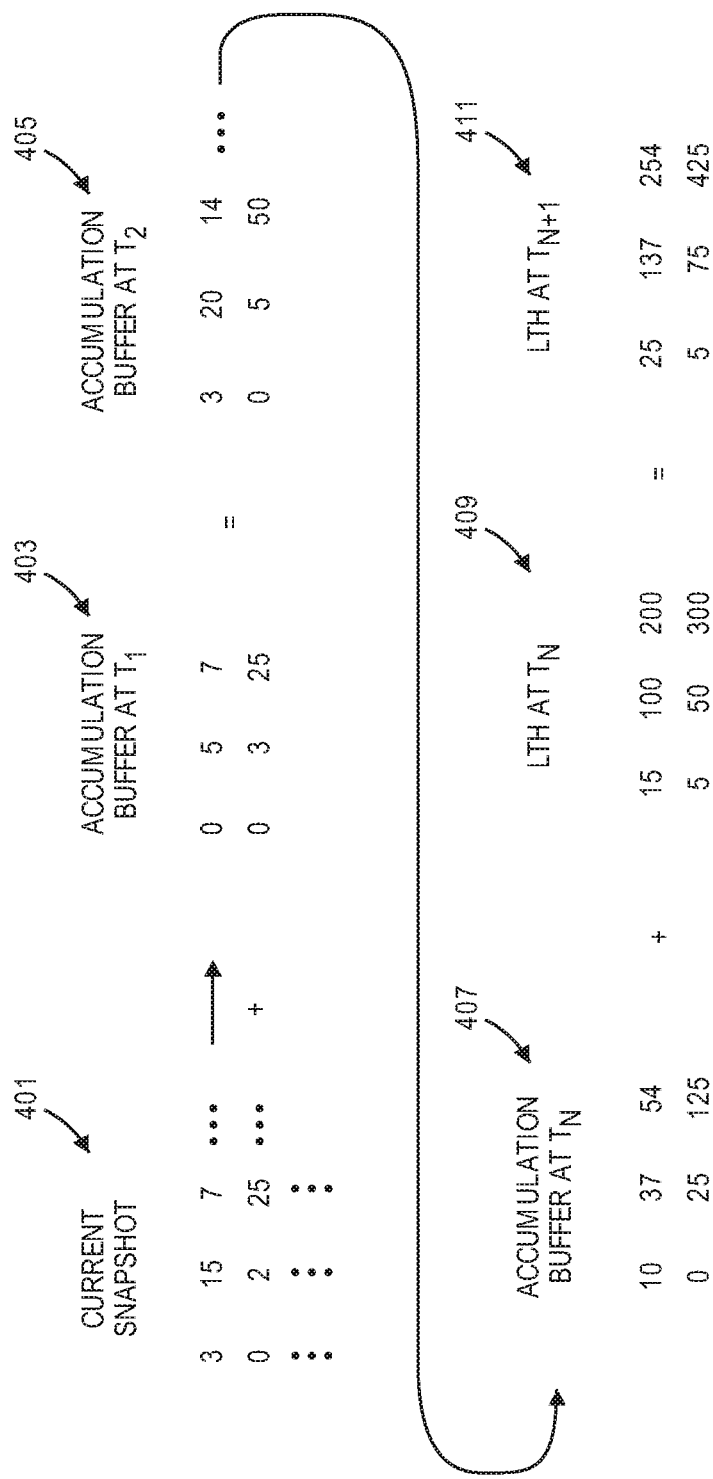
FIG. 4 shows an example of how snapshots of display intensities can be added to one or more accumulation buffers, which can then be added to a long-term history according to one or more embodiments described herein.

FIGS. 3 and 4 show an example of the processes 4, 5, and 6 shown in FIG. 1 which update the long-term history 104 according to one embodiment. Referring now to FIG. 3, in operation 301, a current snapshot of burn-in statistics is received; this can be process 4 as shown in FIG. 1, which results in the burn-in statistics snapshot 115 shown in FIG. 1. FIG. 4 shows a current snapshot 401 which includes pixel luminance values for the current snapshot. In the example shown in FIG. 4, the current snapshot 401 shows six pixel luminance values for two rows of pixels on the display. In operation 303 in FIG. 3, the current snapshot is added to an accumulation buffer, such as accumulation buffer 117 shown in FIG. 1. In one embodiment, addition or saturation addition can be used each time the current snapshot is added to the accumulation buffer, such as accumulation buffer 117 shown in FIG. 1. In the example shown in FIG. 4, the accumulation buffer 403 shows six pixel values which have been accumulated over the period of time that this instance of the accumulation buffer has been operated which is shown as time $T_1$. The result of the addition of the current snapshot 401 with the accumulation buffer at time $T_1$ (accumulation buffer 403) is shown as the accumulation buffer 405 at time $T_2$. It can be seen that pixel values for each pixel in the current snapshot are added to the pixel values in the accumulation buffer to provide accumulated display intensities in the accumulation buffer 405. In one embodiment, the accumulation buffer, such as accumulation buffer 117 can be used to collect multiple snapshots over time, and after that period of time, values in the accumulation buffer are added to the long-term history 104. In one embodiment, this can improve the performance of the data processing system by reducing the energy consumed by the secure processing system, such as secure processing system 101. In particular, the secure processing system 101 may enter a sleep state, or a low-power state while the accumulation buffer 117 accumulates a plurality of snapshots over time, and when the accumulation period ends, the accumulation buffer can be used to add the accumulated pixel display intensity values to the long-term history, such as long-term history 104 after the secure processing system has exited the sleep state. The exit from the sleep state can be in response to a timer/interrupt associated with the accumulation buffer. This is shown in FIG. 3 by the decision operation 305 in which the application processing system 102 determines whether a timer has expired in decision operation 305. The timer can be set to match the accumulation period for the accumulation buffer 117. In one embodiment the timer may be one minute or two minutes or more time. Thus, the secure processing system 101 can be maintained in a low-power state if it is not needed for other operations while the accumulation buffer, such as accumulation buffer 117 accumulates display intensity values until the timer expires. If the timer has not expired, then the decision operation 305 causes processing to revert back to operation 301, in which the next snapshot is received and then accumulated in operation 303. Thus, over time, multiple snapshots are accumulated into the accumulation buffer while the secure processing system 101 can remain in a sleep or low-power state until the timer expires. When the timer expires, the display intensity values in the accumulation buffer, such as accumulation buffer 117 can be flushed out of the accumulation buffer and added to the long-term history, such as long-term history 104, and then the values in the accumulation buffer can be cleared (for example, set to zero) and the timer is reset or restarted and processing returns back to operation 301. The flushing of the accumulation buffer when the timer expires can be seen in FIG. 4, when the accumulation buffer 407 at time Tn is added to the long-term history 409 which can be the long-term history 104 shown in FIG. 1. The result of that addition of accumulation buffer 407 to the long-term history 409 produces an updated long-term history 411 which exists at time Tn+1. It can be seen that operation 307 shown in FIG. 3 corresponds to the process 6 shown in FIG. 1. The result of accumulating the display or pixel intensity values in the long-term history, such as long-term history 104 provides a lifetime accumulated display intensity value for each pixel in a set of pixels on the display. As described elsewhere in this description, all of the pixels in the display may have long-term display intensity values stored within the long-term history or a subset of all of the pixels in the display may have long-term display intensity values stored in the long-term history.

Figure 5:
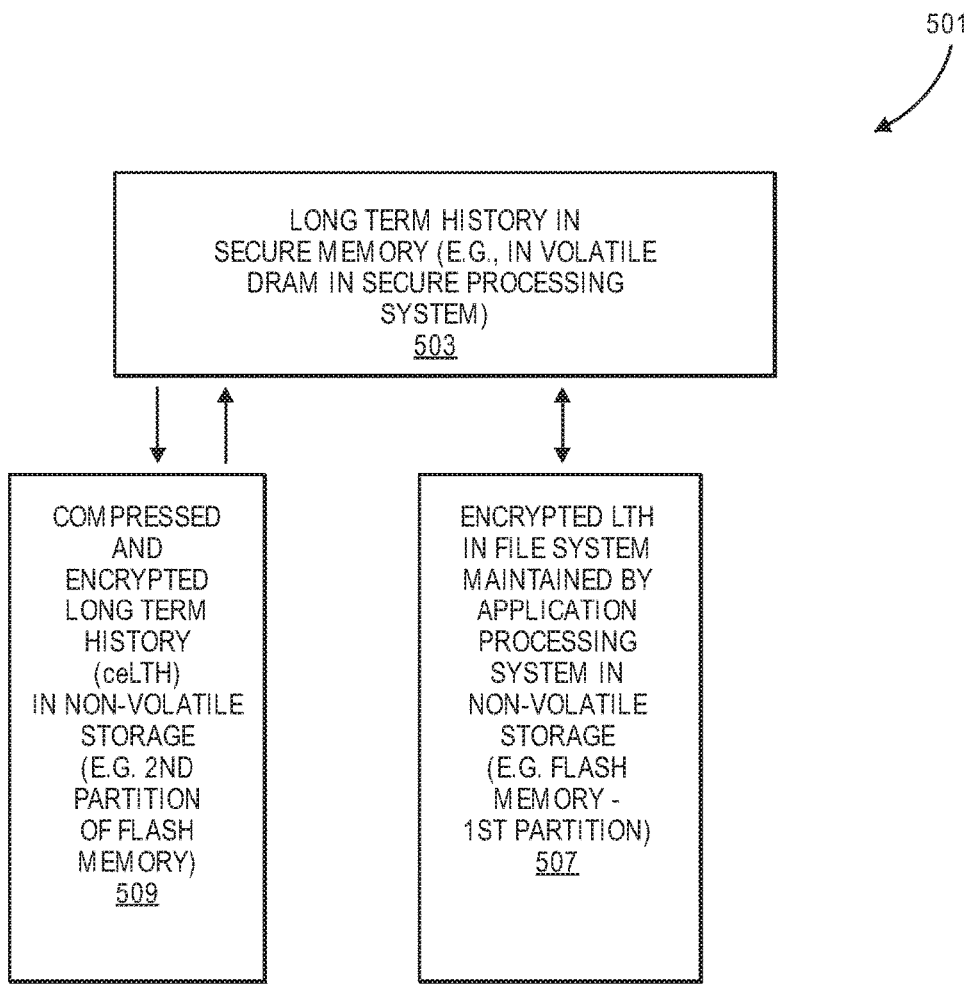
FIG. 5 shows an example of a method for backing up a long-term history according to one embodiment described herein.
Figure 6A:
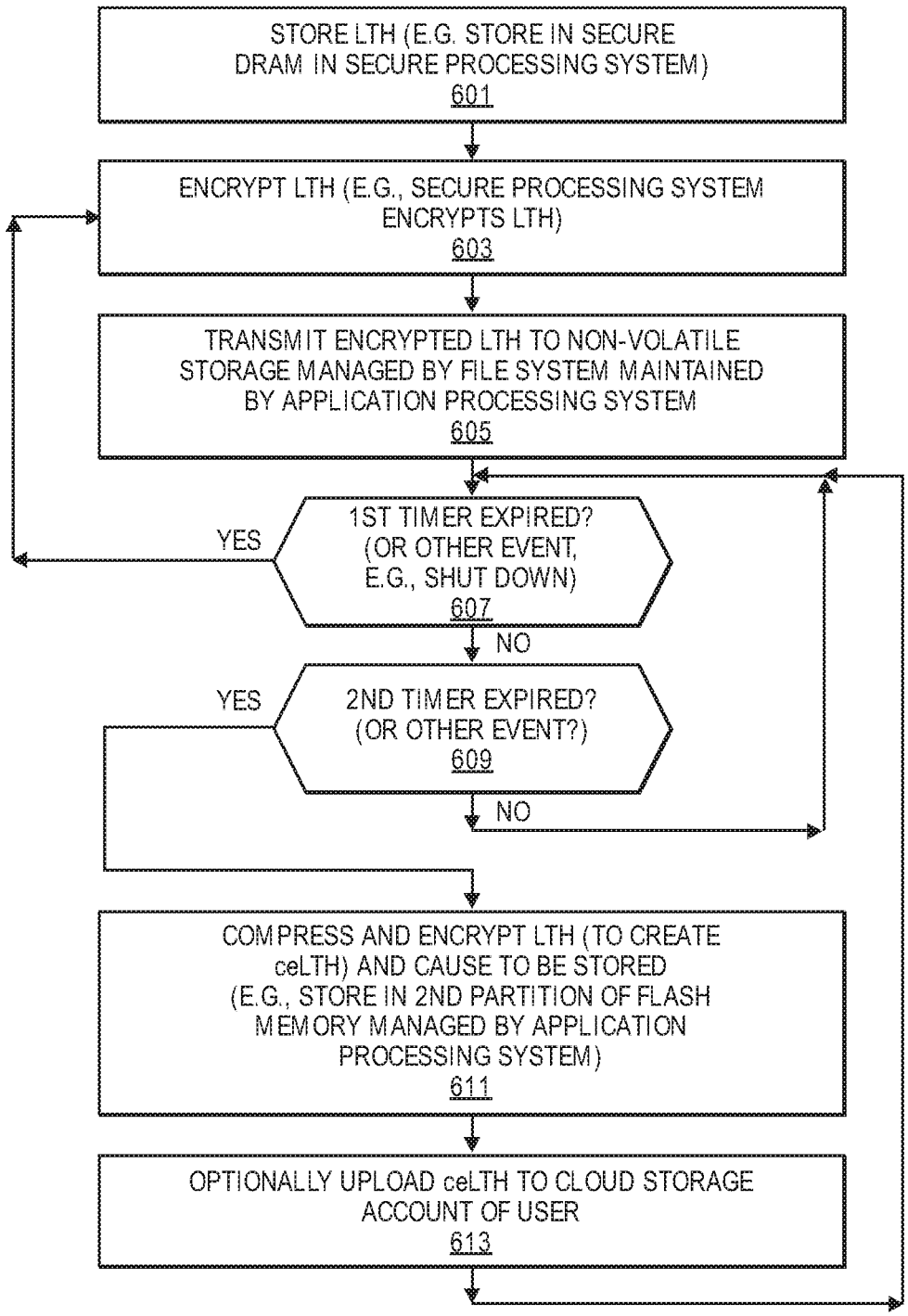
FIG. 6A shows a flowchart which illustrates a method which can be used to back up a long-term history to one or more storage devices.

In one embodiment, the long-term history, such as long-term history 104, is stored during use of the data processing system in volatile DRAM (dynamic random access memory) in the secure processing system 101. It is desirable to retain the long-term history through shutdowns and boot ups of the data processing system so that the long-term history can accurately reflect the lifetime use of each pixel in a set of pixels of the display. FIGS. 5 and 6A show examples in which the long-term history is backed up to one or more non-volatile storage devices such as flash memory or other types of non-volatile storage devices. FIG. 5 shows an example of two backups of the long-term history in a system shown as system 501 in FIG. 5. The long-term history 503 can be backed up to an encrypted long-term history which is stored in a file system maintained by the application processing system, such as application processing system 102. This is shown as the encrypted long-term history 507 which can be the same as the encrypted long-term history 125 shown in FIG. 1. In one embodiment, the encrypted long-term history 507 retains a full and accurate record of all of the long-term pixel intensities displayed over the lifetime of the display without any loss of data. In one embodiment, the encrypted long-term history 507 can be stored in flash memory in a first partition of the flash memory while, in a second partition of the flash memory, a compressed and encrypted long-term history can be stored such as the compressed and encrypted long-term history 509 shown in FIG. 5, which corresponds to the disaster recovery long-term history 129 shown in FIG. 1. In normal use, the encrypted long-term history 507 is the primary backup and can be used at boot up time to re-create the long-term history 104 within the secure processing system 101, as will be described further below. The compressed and encrypted long-term history 509 is a secondary backup which is available should the primary backup (the encrypted long-term history 507) not be available or becomes corrupted.

FIG. 6A shows a method which can use the two backups shown in FIG. 5. In operation 601 of FIG. 6A, the long-term history is stored; in one embodiment, the long-term history can be the long-term history 104 which is stored in secure DRAM in the secure processing system 101. Then in operation 603, which can correspond with process 7 shown in FIG. 1, the long-term history is encrypted. In one embodiment, the secure processing system, such as secure processing system 101 can encrypt the long-term history to produce the encrypted long-term history 119 shown in FIG. 1. Then in operation 605, the encrypted long-term history, such as encrypted long-term history 119 is transmitted to non-volatile storage (for example, through process 8 shown in FIG. 1) that is managed by a file system maintained by the application processing system, such as application processing system 102, which can result in the encrypted long-term history 125 shown in FIG. 1. The transmission in operation 605 occurs across the boundary between the secure processing system 101 and the application processing system 102, and the transmission can occur through a secure interface, such as the secure interface 919 shown in FIG. 9, which is described further below. It will be appreciated that data stored within the secure processing system 101 in one embodiment is secure in the sense that access to that data is only allowed by the secure processing system when permitted by the secure processing system based upon cryptographic policies and security policies. In one embodiment, the secure processing system (SPS) can include memory that contains values which are not extractable outside of the secure processing system such as private keys, device identifiers, etc. and these keys, etc. can be used to encrypt data within the SPS. The transmission in operation of 605 of the encrypted long-term history provides a primary backup in one embodiment, and this backup may be performed on a periodic basis determined by a first timer or by an event driven basis such as a shutdown of the data processing system to an off state, which will require a boot up of the data processing system to return to a running state. Operation 607 shows that the data processing system determines whether the first timer has expired, or whether an event has occurred in order to cause the long-term history stored in the secure processing system, such as long-term history 104, to be encrypted again and transmitted in operation 605 to create the encrypted long-term history 125. In one embodiment, the first timer can be set such that it is relatively infrequent, such as once a day or once every two days, etc. If the first timer is shorter, which it can be, the more frequent writing to flash memory, if flash memory is used as the non-volatile storage to store the encrypted long-term history 125 can reduce the longevity of the flash memory. When the timer expires, as determined by operation 607, the data processing system reverts back to operation 603 in which the long-term history, such as long-term history 104, is encrypted and then transmitted in operation 605 to non-volatile storage in the application processing system 102. If the first timer has not expired as determined in operation 607, then operation 609 is performed to determine whether a second timer has expired or whether an event (e.g., a shutdown or boot up) has occurred. In one embodiment, the second timer can have a period which is much longer than the first timer; for example, the second timer can have a period of one week or two weeks. When the second timer expires, then operation 611 is performed in which the long-term history 104 is compressed and encrypted in process 11 shown in FIG. 1 and then transmitted across the barrier between the secure processing system 101 and the application processing system 102 (shown as process 12) in FIG. 1 and stored in non-volatile storage 129. In one embodiment, the long-term history stored in non-volatile storage 129 can be compressed with a lossy compression algorithm in order to reduce the size of the data structure and can be stored in a second partition of flash memory which is managed by the application processing system 102. In one embodiment, one or more compression algorithms described in U.S. non-provisional patent application Ser. No. 15/683,606, filed Aug. 22, 2017 and entitled "Compression Techniques for Burn-in Statistics of Organic Light Emitting Diode (OLED) Displays" can be used in process 11 to compress the data in long-term history 104 to generate the long-term history stored in non-volatile storage 129; this U.S. non-provisional patent application is hereby incorporated herein by reference. In one embodiment, these one or more compression algorithms can be used in process 7 to create encrypted LTH 119. In addition to the long-term history stored in non-volatile storage 129, the system can also optionally upload (e.g., in operation 613 in FIG. 6A) the compressed and encrypted long-term history to a cloud storage account of the user, from which the compressed and encrypted long-term history can be retrieved should the two backups shown in FIG. 5 become corrupted or are otherwise not available. The uploading of the compressed and encrypted long-term history can allow a user to download the history from the cloud storage and use the downloaded history for the device if it has the same display. The download can be part of a restore operation if the device has been erased or reset to original factory condition. It will also be appreciated that the compressed and encrypted long-term history stored in cloud storage can be used as an alternative to the compressed and encrypted long-term history 509 which corresponds to the long-term history stored in storage 129 shown in FIG. 1. In one embodiment, a data processing system may use only one local backup of the long-term history, such as the encrypted long-term history 125 and rely upon the uploaded copy of the long-term history as a secondary backup of the encrypted long-term history 125. In another alternative embodiment, the secure processing system 101 may maintain its own backup in flash memory, for example, and there may be no backup of the long-term history outside of the secure processing system 101.

Figure 6B:
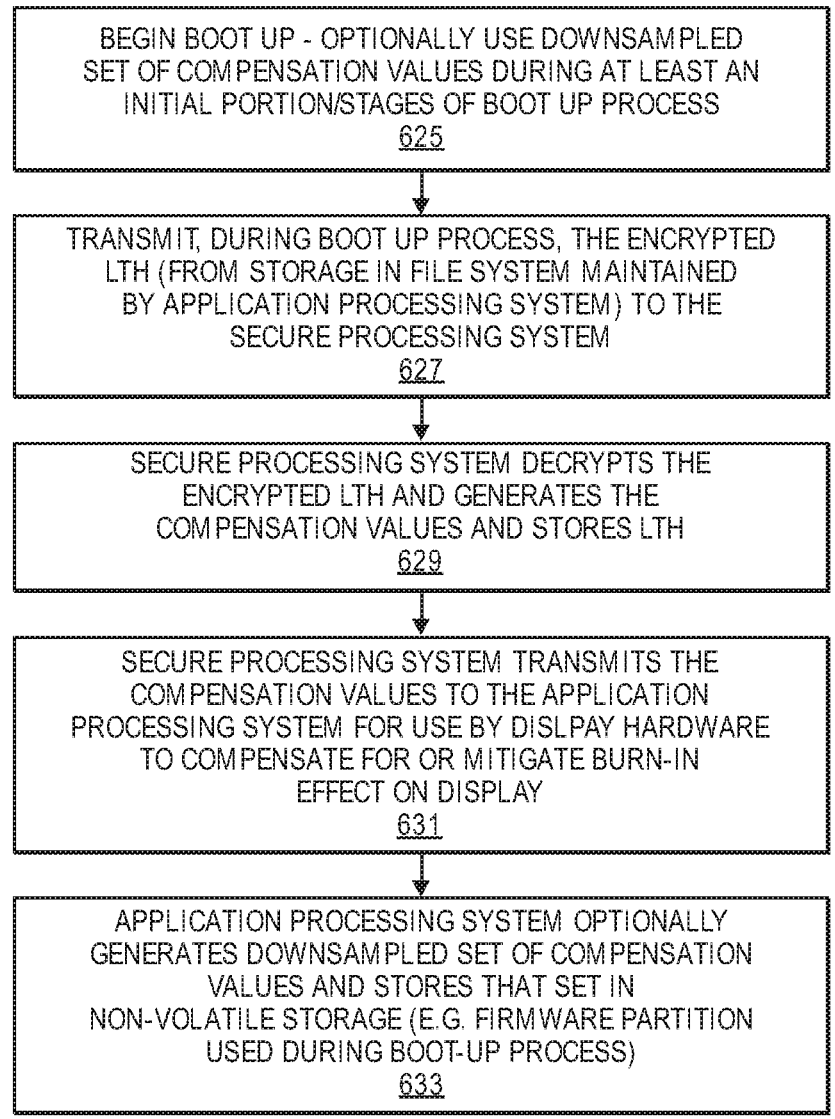
FIG. 6B shows a flowchart which illustrates a process for using a long-term history during a boot up process according to one embodiment described herein.

FIG. 6B shows an example of processes which can occur at boot up time for a system that includes at least some of the data structures shown in FIG. 1 that are stored in different portions of the system which can include both a secure processing system 101 and the application processing system 102. As is known in the art, the boot up of a data processing system is a process of starting the data processing system from an off state in which volatile memory, such as system DRAM is not powered and hence no data or information is stored in the system DRAM during the off state. The boot up process can include numerous operations that are known in the art, such as code verification of code signatures by the secure processing system 101. In one embodiment, optional operation 625 can be performed during at least an initial portion or stage of the boot up process, and operation 625 can include the use of the downsampled set of compensation values such as the burn-in compensation archive 108 stored in firmware used by boot up software during the initial portion or stages of the boot up process. Thus, during the boot up process, the downsampled set of compensation values can be used to compensate for the burn-in effect on the display while the data processing system continues through the boot up process and prior to, for example, the full resolution burn-in compensation values, such as burn-in compensation values 106, becoming available. In operation 627, the application processing system 102 transmits, during a portion of the boot up process, the encrypted long-term history to the secure processing system. In one embodiment, the application processing system 102 shown in FIG. 1 transmits the encrypted long-term history 125 through process 8 into the secure processing system 101 to produce the encrypted long-term history 119. Then in operation 629, the secure processing system can decrypt the encrypted long-term history, such as encrypted long-term history 119 through process 7 shown in FIG. 1. After decrypting the encrypted long-term history to produce LTH 104, the secure processing system can then generate compensation values either immediately or at some time in the future. The compensation values can be transmitted in one embodiment of operation 631 to the application processing system (shown as process 1); an alternative embodiment of operation 631 is described below. The burn-in compensation values, such as burn-in compensation values 106 can then be used by display hardware to compensate for or mitigate burn-in effect on the display while images are presented on the display. The method shown in FIG. 6B can also include optional operation 633 in which the application processing system generates a downsampled set of compensation values (shown as process 2 in FIG. 1) and stores that set in non-volatile storage such as a firmware partition used during the boot up process. After the completion of the method shown in FIG. 6B, processing can perform the method shown in FIG. 2 to update the long-term history over time to capture display intensity values for at least a set of pixels on the display. An alternative embodiment of the method shown in FIG. 6B can store both the encrypted long-term history and the most recently generated set of compensation values (e.g., BIC) in the file system maintained by the application processing system (e.g., the most recently generated BIC is stored with the encrypted LTH 125 in that file system). In this alternative embodiment, each time the secure processing system 101 generates a new BIC from the LTH 104, the secure processing system 101 causes the application processing system 102 to store the new BIC in the file system maintained by the application processing system 102. In one embodiment, the number of BIC generations is rate limited in time and can be limited to be about once per every few days (e.g., two days) on average. Thus, in this alternative embodiment, the encrypted LTH 125 and the stored BIC can be retrieved from the file system by the application processing system 102 at boot up time, and the application processing system 102, during boot up, can provide the encrypted LTH 125 to the secure processing system 101 and provide the stored BIC to the display system (to provide burn-in compensation values 106). This alternative embodiment uses an alternative embodiment of operation 631 in which the application processing system 102 provides the compensation values to the display system for use by the display hardware.

Figure 7A:
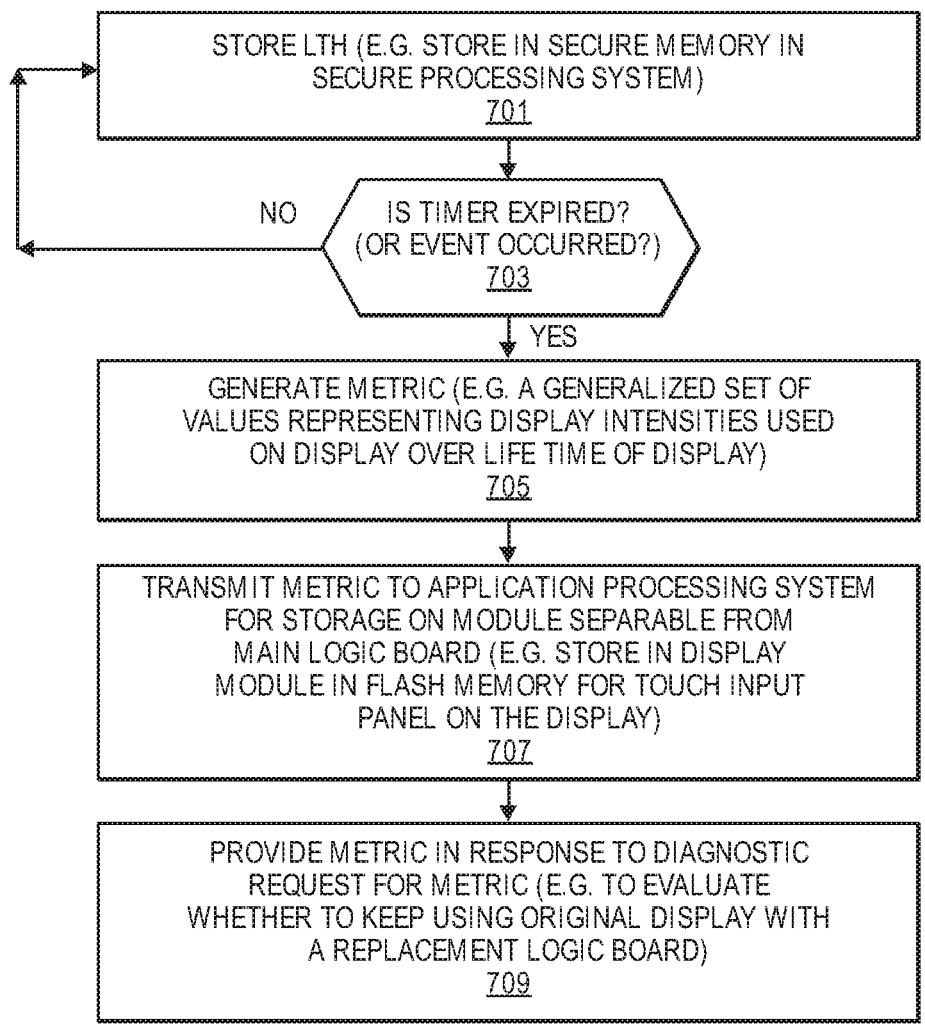
FIG. 7A is a flowchart which shows a method according to one embodiment for generating a metric that can be stored, for example, on a display module which is separable from a main logic board.

FIGS. 7A and 7B show an example of a data processing system which uses a burn-in metric, such as burn-in metric 121. In one embodiment, that burn-in metric can be stored in non-volatile storage in a display module, which in one embodiment is separable from a main logic board of a data processing system. FIG. 7B shows an example of a data processing system 725 which includes a main logic board 727 and a display module 729. In one embodiment, the main logic board can include a system-on-chip 737, which includes both a secure processing system 733 and an application processing system 735. In one embodiment, the secure processing system 101 can be included as part of the secure processing system 733, and the application processing system 735 can include one or more application system processors and other hardware components of the application processing system 102. The application processing system 735 is coupled to system DRAM 741 and to non-volatile memory such as flash storage or flash memory 743. These components are all disposed on the main logic board which is separable from the display module 729 but is connected to the display module 729 through one or more interconnects, such as interconnect 745 which electrically couples components in the display module to components on the main logic board 727. The long-term history 104 and a burn-in metric computed from the long-term history, such as burn-in metric 121 can be stored within the secure processing system 733. The display module 729 can include a display, such as an organic light-emitting diode display or other types of displays, and can further include a touch input panel which is superimposed over the display to receive touch inputs from a user. In one embodiment, the combination of the display and the touch input panel can provide a touchscreen display and input device as is known in the art. The display and touch input panel are coupled through the interconnect 745 to the application processing system 735, which provides display values, such as pixel luminance values to the display, and which receives input values from the input touch panel during use by the user. The display module 729 can also include one or more non-volatile storage such as non-volatile storage 747, which in one embodiment, can be firmware used by the touch input panel. In one embodiment, the non-volatile storage 747 can be flash memory disposed on the display module 729 and can store the BIM 121 (and hence corresponds to storage 127 in FIG. 1). The separability of the display module 729 from the main logic board 727 allows for one component to be replaced while the other component remains part of the data processing system. For example, if a failure occurs in the main logic board 727, the display module 729 can be kept as part of the data processing system 725 and a replacement main logic board can be used to replace the original main logic board 727 and can be coupled to the display module 729 through the interconnect 745. The diagnostic port 749 can be coupled to the non-volatile storage 747 in order to allow a technician to diagnose the state of the display based on a burn-in metric which can be stored within the non-volatile storage 747. In one embodiment, the burn-in metric 121 is transmitted to the non-volatile storage 747 as part of process 10 shown in FIG. 1. This allows a technician to diagnose the state of the display based on values in the burn-in metric even if the main logic board has totally failed such that information cannot be obtained about the state of the system from the main logic board 727. Moreover, because BIM 121, in one embodiment, provides no spatial display information from which an image can be derived, a user's privacy is preserved while allowing for an assessment of the display's age. A technician who is attempting to repair or diagnose the data processing system 725 can use the diagnostic port 749 to retrieve the burn-in metric, such as burn-in metric 121, which has been stored into the non-volatile storage 747 through process 10 shown in FIG. 1.

The method shown in FIG. 7A can be used with the data processing system 725 shown in FIG. 7B. In operation 701, the long-term history is stored; in one embodiment, the long-term history can be stored in secure memory in the secure processing system, such as secure processing system 101. In operation 703, the system determines whether a timer has expired or whether an event has occurred. The timer used in operation 703 can be set so that the secure processing system infrequently generates the burn-in metric. For example, the timer can be set so that the secure processing system generates the burn-in metric once a week or once a month or some other relatively infrequent time period. In one embodiment, the burn-in metric may be generated as often as once a day. In another embodiment, the burn-in metric may be generated in response to an event such as the shutdown of the data processing system or the boot up of the data processing system. When the event occurs or the timer expires, operation 705 occurs. In operation 705 the secure processing system, such as secure processing system 101 can generate a burn-in metric (shown as process 9). In one embodiment, the secure processing system 101 produces a generalized set of values representing display intensities used on the display over the lifetime of the display based upon pixel values in the long-term history 104. In one embodiment, there is no spatial information from which an image can be derived from the burn-in metric. In other words, while the long-term history may, under certain circumstances allow the discovery of a discernible image from the long-term history, no such images will be discernible from the burn-in metric in one embodiment. In one embodiment, the long-term history has a lifetime display intensity value for each pixel of the display while the burn-in metric generalizes over the entire display or a portion of the display pixel intensity values. In one embodiment, the burn-in metric may use thresholds to bin or place into buckets different pixels that have different levels of aging. The burn-in metric may be calculated based upon the number of pixels in each of the different bins and a set of values indicating the number of pixels in those bins can reflect a generalized state of the display. For example, if most of the pixels on the display are lightly aged and only a very small number are heavily aged, then the state of the display may generally be regarded as lightly aged. Each bin can correspond to a different quantized level of aging, from the least aged to most aged bins.

In one embodiment, the burn-in metric can be values which are based on: 3 values for a Red (R) channel, 3 values for a Green (G) channel, and 3 values for a Blue (B) channel (assuming an RGB color space). Within each channel, the 3 values can be a minimum pixel intensity LTH value, a median pixel intensity LTH value, and a maximum pixel intensity LTH value. One implementation that uses this set of 9 values can compute 9 BIM values:

| | | |
|---|---|---|
| BIM(min(R)) | BIM(min(G)) | BIM(min(B)) |
| BIM(median(R)) | BIM(median(G)) | BIM(median(B)) |
| BIM(max(R)) | BIM(max(G)) | BIM(max(B)) |

Where
    each BIM value can be computed as: BIM(x), and
Where
    $BIM(x) = 1 - EXP[ - (x / A\_ref(c))\ \hat{}\ beta(c) ]$
    A_ref(c) and beta(c) are per color channel tuning constants
    min(c) is the minimum LTH value for color channel c
    median(c) is the median LTH value for color channel c
    max (c) is the maximum LTH value for color channel c
    x is one of the 3 min(c) values (e.g., min(R)) or 3 median(c) values (e.g., median(R)) or 3 max(c) values Once the burn-in metric has been generated by operation 705, the secure processing system can transmit the burn-in metric, such as burn-in metric 121 across the interface between the secure processing system 101 and the application processing system 102, which in turn can transmit the burn-in metric to the non-volatile storage on a module which is separable from the main logic board, such as the non-volatile storage 747 shown in FIG. 7B. Operation 707 shown in FIG. 7A corresponds to process 10 in which the burn-in metric 121 is caused to be stored in a non-volatile storage on a module which is separable from the main logic board. In operation 709, the metric which is stored in the module that is separable from the main logic board, such as the non-volatile storage 747, can be retrieved in response to a diagnostic request for the metric. For example, a technician who is diagnosing a data processing system can retrieve the metric in order to evaluate whether to keep the original display with a replacement logic board based upon the aging data provided by the burn-in metric.

Figure 7C:
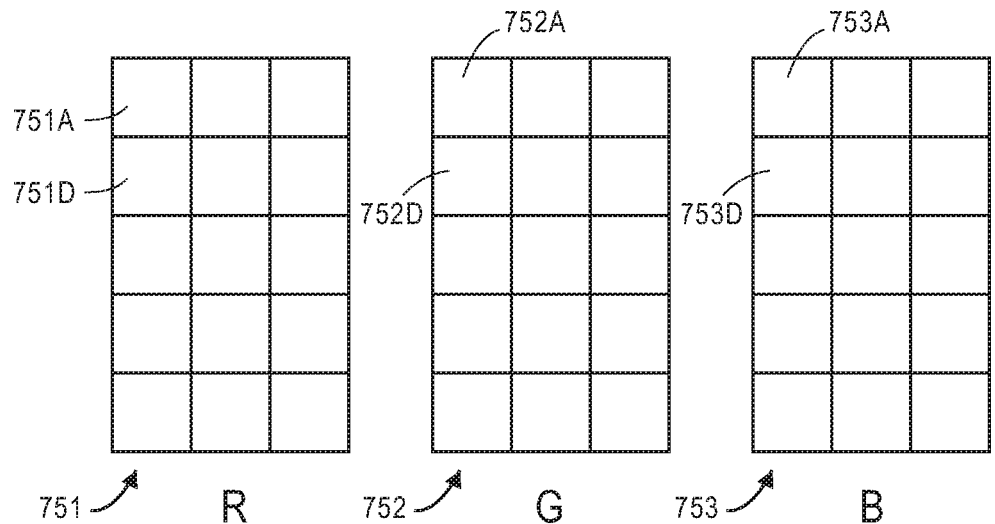
FIG. 7C shows an example of a plurality of regions (in a grid layout) on a display, wherein a burn-in metric can be calculated for each region.

FIG. 7C shows another example of the use of burn-in metrics for a display in a data processing system. In this example, the display is logically separated into multiple regions or tiles, each of which contains a plurality of pixels of the display (e.g., a block of 10×10 pixels or 20×20 pixels or other sizes of rectangular sets of pixels). The multiple regions can be arranged in an array that resembles a grid of rectangles, each of which can be the same size. In one embodiment, the multiple regions can cover the entire display (and hence all pixels of the display are in at least one region), while in another embodiment, the multiple regions cover only a portion of the display. In one embodiment, each color channel (such as the red (R), green (G), and blue (B) color channels) has its own set of multiple regions so that BIM values are computed for each color channel for each region, and each BIM can be computed in the form described herein (e.g., see equation above for BIM(x)). Thus, in one embodiment, each region can have 9 computed BIM values (which can be referred to as TBIM values): TBIM (min (R)), TBIM (median (R)), TBIM (max (R)), TBIM (min (G)), TBIM (median (G)), TBIM (max (G)), TBIM (min (B)), TBIM (median (B)), and TBIM (max (B)), and these TBIM values are computed from LTH values for pixels only within each region. Hence, burn-in metrics can be available for each region (independently of other regions) and these metrics can be used to diagnose the display or to make changes to burn-in mitigation methods or algorithms or to make changes to the user interface or to perform a combination of these options. In the example shown in FIG. 7C, the display is logically separated into a set of regions for each of the three color channels (in this case, R, G, and B). In this example, there is a set of regions 751 for the red color channel for the display, a set of regions 752 for the green color channel for the display, and a set of regions 753 for the blue color channel for the display. The set of regions 751 includes regions 751A and 751D, the set of regions 752 includes regions 752A and 752D, and the set of regions 753 includes regions 753A and 753D. In one embodiment, each of the regions can have the same number of pixels (e.g. 100 pixels by 70 pixels) for each of these three color channels, while in another embodiment the number of pixels in a region in one color channel can be different than the number of pixels in the regions in another color channel. For example, the red and blue color channels can have the same number of pixels in a region while the number of pixels in the green color channel's regions is larger. The sizes of the regions can be selected so that they are large enough, in one embodiment, to ensure that there is no spatial information from which an image can be derived from the burn-in metric for a region. In one embodiment, the set of multiple regions can be used without a single burn-in metric for the entire display, while in another embodiment, the set of multiple regions can be used with the single burn-in metric. In the case where both metrics are used, the single burn-in metric can be stored in the display module and used by a technician as described above while the multiple burn-in metrics for the multiple regions can be provided to and used by a developer to make modifications as described herein.

Figure 7D:
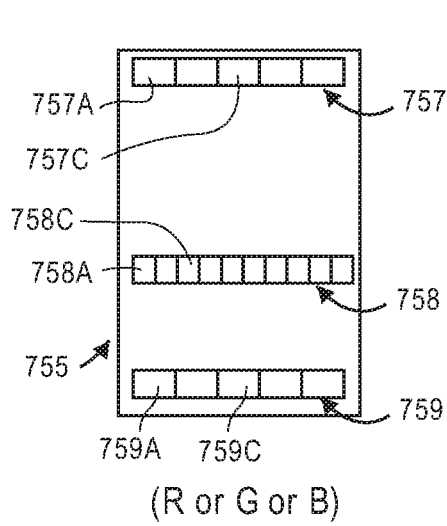
FIG. 7D shows an example of a plurality of regions that are selectively located on a display.

The embodiment shown in FIG. 7D uses one or more sets of regions that can be selectively located in locations that are anticipated to possibly experience high burn-in or show high burn-in effects, such as regions that are anticipated to frequently have high display intensity contrast (between dark pixels and bright pixels). For example, a region of a user interface that is often used by users and contains a high display intensity contrast can be a target for a set of selectively located regions in which TBIM values are generated and collected (and provided to a developer for use as described herein). Certain applications are used more frequently than other applications by users, and the higher usage of those applications will tend to have a higher chance of causing burn-in effects, particularly in regions of the user interface where there is a high display intensity contrast such as a dark line that separates regions of the UI, and bright pixels are immediately next to the dark line. By placing these selectively located regions in such areas, information about burn-in and about the mitigation of burn-in can be captured and used by, for example, a developer of hardware or software used in the device that includes the display. In the example shown in FIG. 7D, the display 755 has been logically separated into three regions that each contain a set of selectively located regions. It will be appreciated that FIG. 7D shows one of the three color channels in one embodiment in which each of the three color channels include the arrangement of selectively located regions shown in FIG. 7D. In particular, the display 755 includes a set of regions 757 that is located near the top of the display, a set of regions 758 that is located near the middle of the display, and a set of regions 759 that is located near the bottom of the display. The set of regions 757 includes regions 757A and 757C, and TBIM values can be computed for each of these regions and used as described herein (e.g., in a method similar to a method shown in FIG. 7F). The set of regions 758 includes regions 758A and 758C, and TBIM values can be computed for each of these regions and used as described herein (e.g., see FIG. 7F). The set of regions 759 includes regions 759A and 759C, and TBIM values can be computed for each of these regions and used as described herein (e.g., see FIG. 7F). In one embodiment, TBIM values computed from the selectively located regions can be used as described herein (e.g., in the method shown in FIG. 7F) without a single burn-in metric for the entire display being used; in another embodiment, the single burn-in metric for the entire display can be used to perform a method for diagnostic use (e.g., in the method shown in FIG. 7A), while the TBIM values computed from the selectively located regions (e.g., shown in FIG. 7D) can be used to perform a method as shown in FIG. 7F.

Figure 7E:
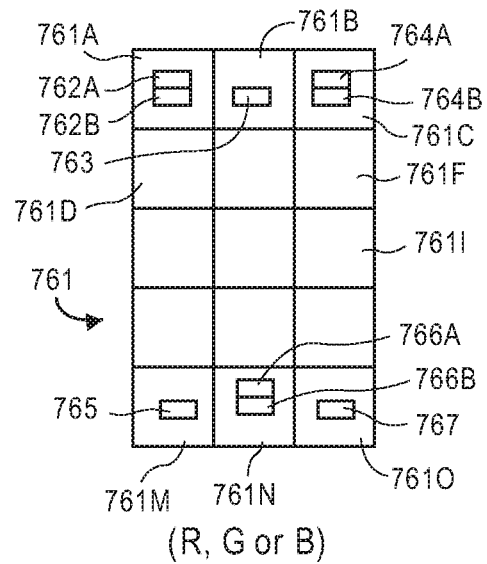
FIG. 7E shows an example of a plurality of regions on a display, wherein the regions include both selectively located regions and regions that form a grid layout.

FIG. 7E shows an example of an embodiment in which selectively located regions are combined with and overlap with regions in a regular grid of regions that can cover all or almost all of a display. The grid in the case of FIG. 7E is the set of regions 761, which includes regions 761A through 761O; regions 761A, 761B, and 761C cover the top of the display, regions 761M, 761N, and 761O cover the bottom of the display, and regions 761F and 761I cover a portion of the right side of the display, and region 761D covers a portion of the left side of the display. The TBIM values from the set of regions 761 can be used to perform a method, such as a method shown in FIG. 7F, to provide information that can be used to verify the sufficiency of existing burn-in mitigation or to make changes to improve burn-in mitigation (e.g., if the existing burn-in mitigation is not sufficient) or to make changes to the UI to reduce burn-in, etc. In addition, the TBIM values from the selectively located regions 762A, 762B (within region 761A), selectively located region 763 (within region 761B), selectively located regions 764A, 764B (within region 761C), selectively located region 765 (within region 761M), selectively located regions 766A, 766B (within region 761N), and selectively located region 767 (within region 761O) can also be used to perform a method, such as the method shown in FIG. 7F, to provide information to a developer to verify the sufficiency of existing burn-in mitigation or to make changes to improve burn-in mitigation (e.g., changing mitigation parameters or algorithms, etc.) or to make changes to the UI to reduce burn-in, etc. The TBIM values from the selectively located regions in FIG. 7E provide finer grain data about potential problem locations identified by a developer of hardware or software that operates with the display from which the TBIM values are computed. It will be appreciated that the embodiment shown in FIG. 7E can also be used with a single BIM value for the entire display that can be used by a technician as shown in the methods related to FIG. 7A. It will also be appreciated that FIG. 7E shows regions that can be used with each color channel in a set of color channels, such as R, G, and B color channels.

Figure 7F:
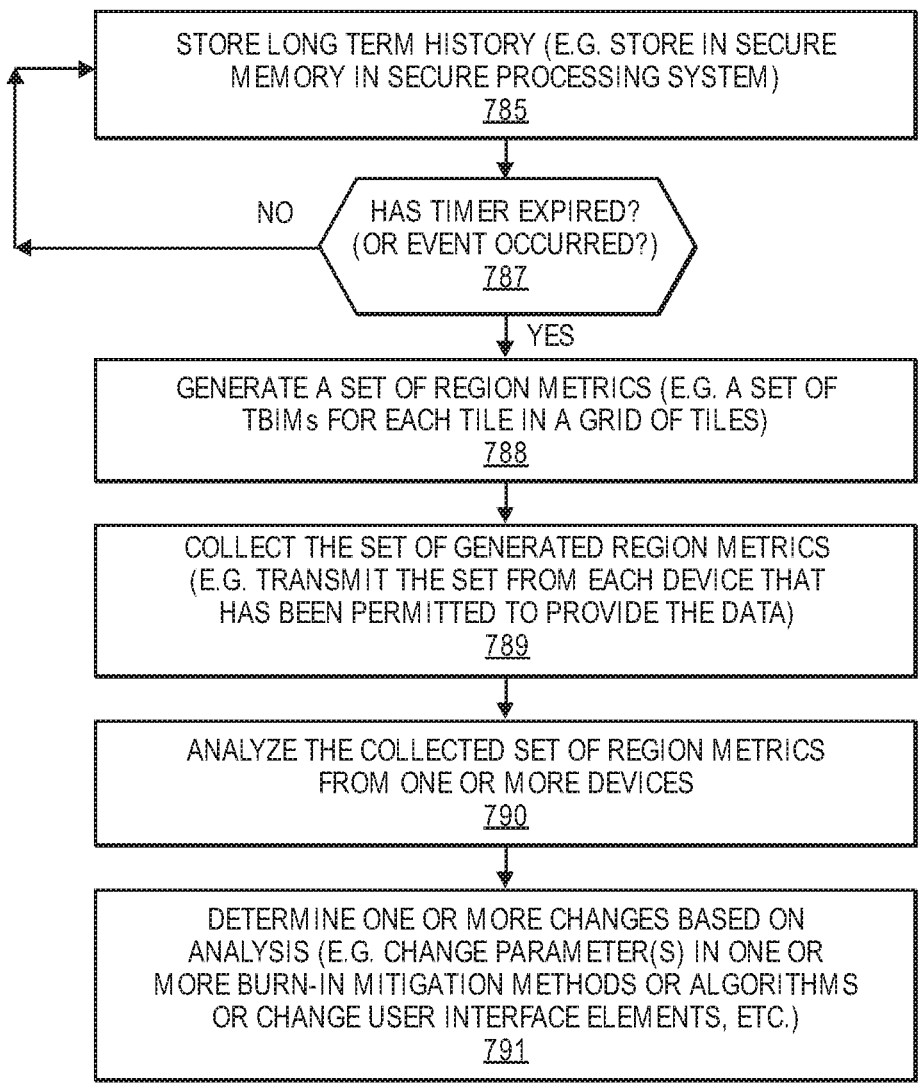
FIG. 7F shows an example of a method according to one embodiment which uses a plurality of regions to create a plurality of burn-in metrics, at least one burn-in metric for each region.

The regions shown in and described relative to FIGS. 7C, 7D, and 7E can be used with methods based on FIG. 7F. A method according to FIG. 7F can use the data structures in FIG. 1 with a data processing system that includes a secure processing system (e.g., the system shown in FIG. 9) or, in an alternative embodiment, a method according to FIG. 7F can be used in a system that does not include a secure processing system or does not use one or more of the data structures shown in FIG. 1. A method according to FIG. 7F can be used with a single BIM for an entire display (e.g., as described relative to FIG. 7A) or can be used without such a single BIM, and a method according to FIG. 7F can operate in conjunction with methods according to FIGS. 2, 3 and/or 8B. A method according to FIG. 7F can begin in operation 785 in which a data processing system stores a long-term history, such as the long-term history 104 (in FIG. 1) which can be stored in secure memory within a secure processing system. The long-term history stored in operation 785 can be generated using a method based on a method according to FIG. 2. In operation 787, the data processing system can use a timer (or event occurrence) to determine when to generate the next set of region metrics (e.g., TBIM values). The timer used in operation 787 can be set so that the data processing system infrequently generates the set of region metrics. For example, the timer can be set so that the system generates the set of region metrics about once a week or once a month or some other relatively infrequent time period. In another embodiment, the set of region metrics can be generated as often as once a day. Once the timer expires, the system generates, in operation 788, the next set of region metrics for the regions (e.g., a set of TBIM values) and the timer is reset to begin another sequence. In another embodiment, the set of region metrics may be generated in response to an event such as a shutdown or boot up of the data processing system. When the event occurs (or the timer expires), operation 788 is performed (e.g., TBIM values are computed for each region in the set of regions). Each TBIM value can be a generalized value over the pixels only within the region used to compute the TBIM value, and the value represents an aging of the pixels in the region without providing any spatial information from which an image can be derived from the region metric.

In operation 789, a set of generated region metrics can be collected from one or more devices (e.g., smartphones) used by users. In one embodiment, the users give permission for the collection of region metrics by agreeing to do so in a user interface which can provide the ability to opt-in or opt-out (by opting-out, the user denies permission and hence the region metric data is not collected from the user's device). In one embodiment, the generated region metrics can be collected by transmitting TBIM values for each region from devices (that have received permission from users) to one or more developers of hardware and/or software of the devices that include the display. These one or more developers can, in operation 790, analyze the region metrics to determine (for example) the sufficiency of the burn-in mitigation methods used on the display or to diagnose or otherwise analyze the condition of the display. For example, a set of TBIM values from many devices may reveal that the burn-in mitigation methods are not sufficient in the top corners of the display or the bottom corners of the display, and this would suggest that a change to the burn-in mitigation methods (either global changes for the entire display or local changes in only portions of the display, such as the top and bottom corners) may be desirable or perhaps a change to the user interface may be desirable or a combination of both. In operation 791, the one or more developers can determine one or more changes based on the analysis of the region metrics received from one or more devices. For example, a developer can determine to modify the burn-in mitigation methods by modifying software that participates in these methods and then distributing the modified software to devices for installation on those devices to improve the burn-in mitigation methods on those devices. In addition to or as an alternative to modifications of such methods, the developer can modify the user interface to reduce high intensity pixel values in certain regions based on the region metrics; the modifications of the user interface can be implemented through changes to data and/or software which can be distributed to devices for installation on those devices to minimize burn-in on the displays of those devices. One or more developers can, over time, collect data from these region metrics and repeatedly revise or modify the devices through downloads (or other distribution mechanisms) of software and/or data to the devices.

Figure 8A:
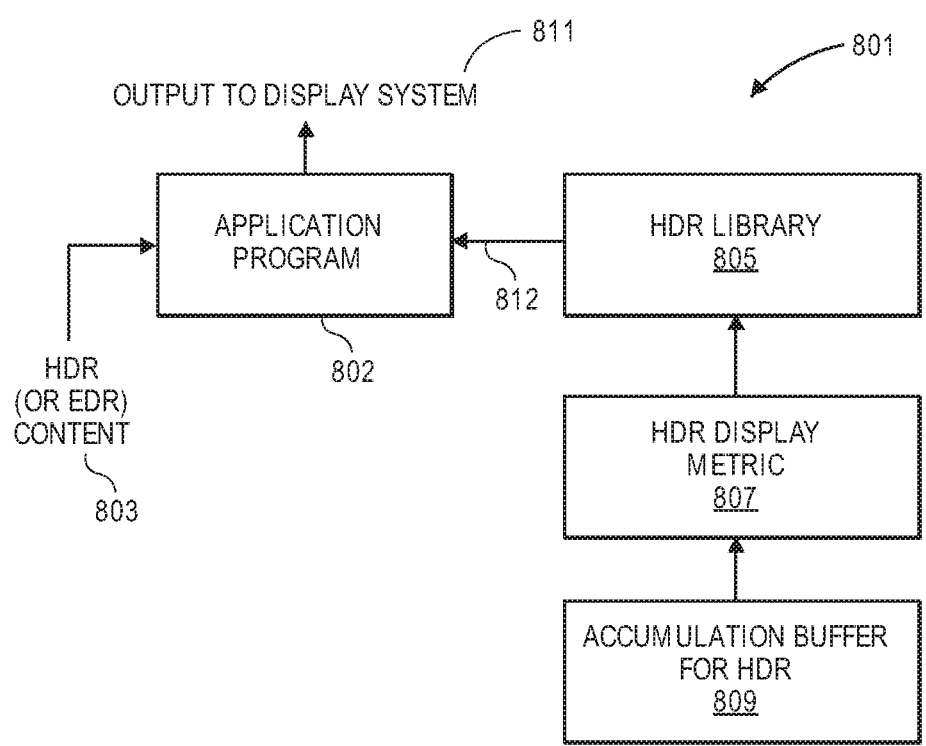
FIG. 8A shows an example of a system which can display extended or high dynamic range content according to one embodiment described herein.
Figure 8B:
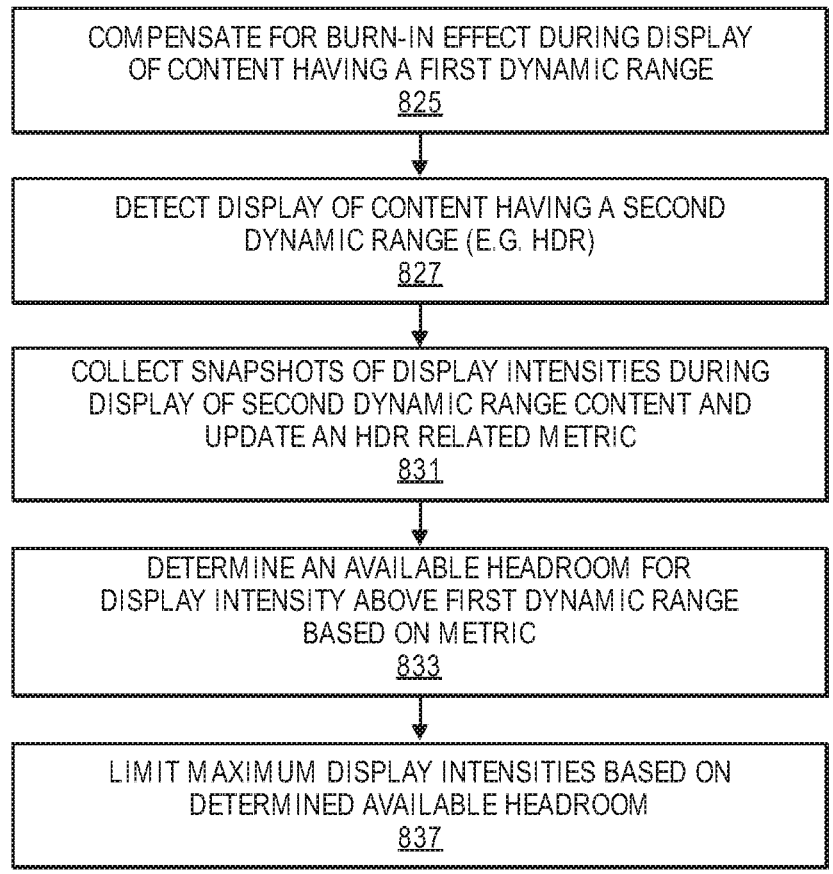
FIG. 8B shows a flowchart that depicts a method according to one embodiment for displaying extended or high dynamic range content in the context of a system which compensates for burn-in effect during display of content.

FIGS. 8A and 8B show another aspect of the embodiments described herein. This aspect relates to a data processing system which can display content having an extended dynamic range or a high dynamic range in addition to standard dynamic range content. As is known in the art, content having an extended dynamic range or a high dynamic range can cause pixels to display or emit light in much higher luminance levels than standard dynamic range content. As a result, a data processing system which often displays content having a high dynamic range or an extended dynamic range will cause the pixels in the display to age faster than if only content of a standard dynamic range is displayed on the display. Oftentimes, high dynamic range content will be displayed by an application program, such as a movie presentation program or a game program which generates the high dynamic range content for output to a display system, such as a display coupled to the display hardware 110 shown in FIG. 1. FIG. 8A shows an example of an application program 802, which can execute on the application processing system 102 shown in FIG. 1. The application program may be a movie presentation program (e.g., a Netflix application) or a game program which receives high dynamic range or extended dynamic range content 803 and which processes that content to output pixel luminance values at an output 811 for display on a display coupled to display hardware 110. The system 801 shown in FIG. 8A can use the method of FIG. 8B to mitigate burn-in effect which can be accelerated due to the display of high dynamic range content. The system 801 can be, in one embodiment, part of the application processing system 102 shown in FIG. 1 and can include an accumulation buffer 809 for storing accumulated pixel intensity or pixel luminance values during the display of HDR or EDR content. The accumulation buffer 809 can be the same as the accumulation buffer 131 shown in FIG. 1. The luminance intensity values from the accumulation buffer 809 may be used to compute a metric indicating the amount of overdriving of pixels beyond a standard dynamic range when HDR or EDR content is displayed. In one embodiment, the HDR related metric 807 may be a long-term or lifetime metric maintained over the lifetime of the system indicating the amount of overdriving of pixel luminance values which have occurred as a result of the lifetime display of HDR or EDR content on the display. In one embodiment, the HDR display metric 807 corresponds to the HDR BMI 132 shown in FIG. 1, and this HDR display metric 807 can be computed by, in one embodiment, the HDR library 805 which can also determine an available headroom which can be used to limit maximum display intensities during the display of HDR or EDR content. FIG. 8B shows an example of a method which can be performed with the system shown in FIG. 8A which can be part of the application processing system 102. In operation 825, the data processing system can compensate for burn-in effect during display of content having a first dynamic range such as a standard dynamic range. In one embodiment, operation 825 can be similar to operation 209 shown in FIG. 2. In operation 827, the system detects that content having a second dynamic range is about to be displayed or is being displayed. The second dynamic range can be an extended dynamic range (EDR) or a high dynamic range (HDR). In either case, EDR or HDR content can have pixel luminance values significantly higher than pixel luminance values in standard dynamic range content. In response to detecting the display of content having the second dynamic range, the data processing system can begin to collect snapshots of display intensities, such as pixel luminance values during display of the second dynamic range content; this is shown as process 13. These snapshots can be added to an accumulation buffer which can store pixel luminance values during the display of EDR or HDR content. Periodically, over time, the values in the accumulation buffer can be used to update an HDR related metric, which can be part of process 14 shown in FIG. 1 to provide an updated HDR related metric, such as the HDR burn-in metric 132 shown in FIG. 1. This HDR burn-in metric or HDR display metric 807 shown in FIG. 8A can then be provided to a software library, such as the HDR library 805 which can then determine in operation 833 an available headroom, such as available headroom 812, which can be used in operation 837 to limit the maximum display intensities that are output from the application program, such as an application program 802 as output 811. The HDR display metric can be a lifetime or long-term display metric which indicates how much overdriving of the pixel luminance values has occurred over the lifetime of the device in which HDR content or EDR content has been displayed on the device. The HDR display metric can then be used to derive an available headroom, which can then be used to limit the maximum display intensities. For example, if the pixels have been lightly aged because there has been very little HDR content displayed on the pixels and an HDR movie begins playback on the display, the headroom may be higher to allow, for example, a pixel luminance value that is twice the maximum pixel luminance value for standard dynamic range content. Over time, as more HDR content is presented on the display, the HDR display metric will change, which in turn causes the HDR library 805 to reduce the available headroom and to thereby limit the maximum display intensities that can be presented during playback of HDR content such as a movie or a game. For example, as a result of significant HDR playback over the lifetime of the display, the available headroom can be reduced from 2.0 times to 1.5 times over the maximum pixel luminance value for standard dynamic range content.

Figure 9:
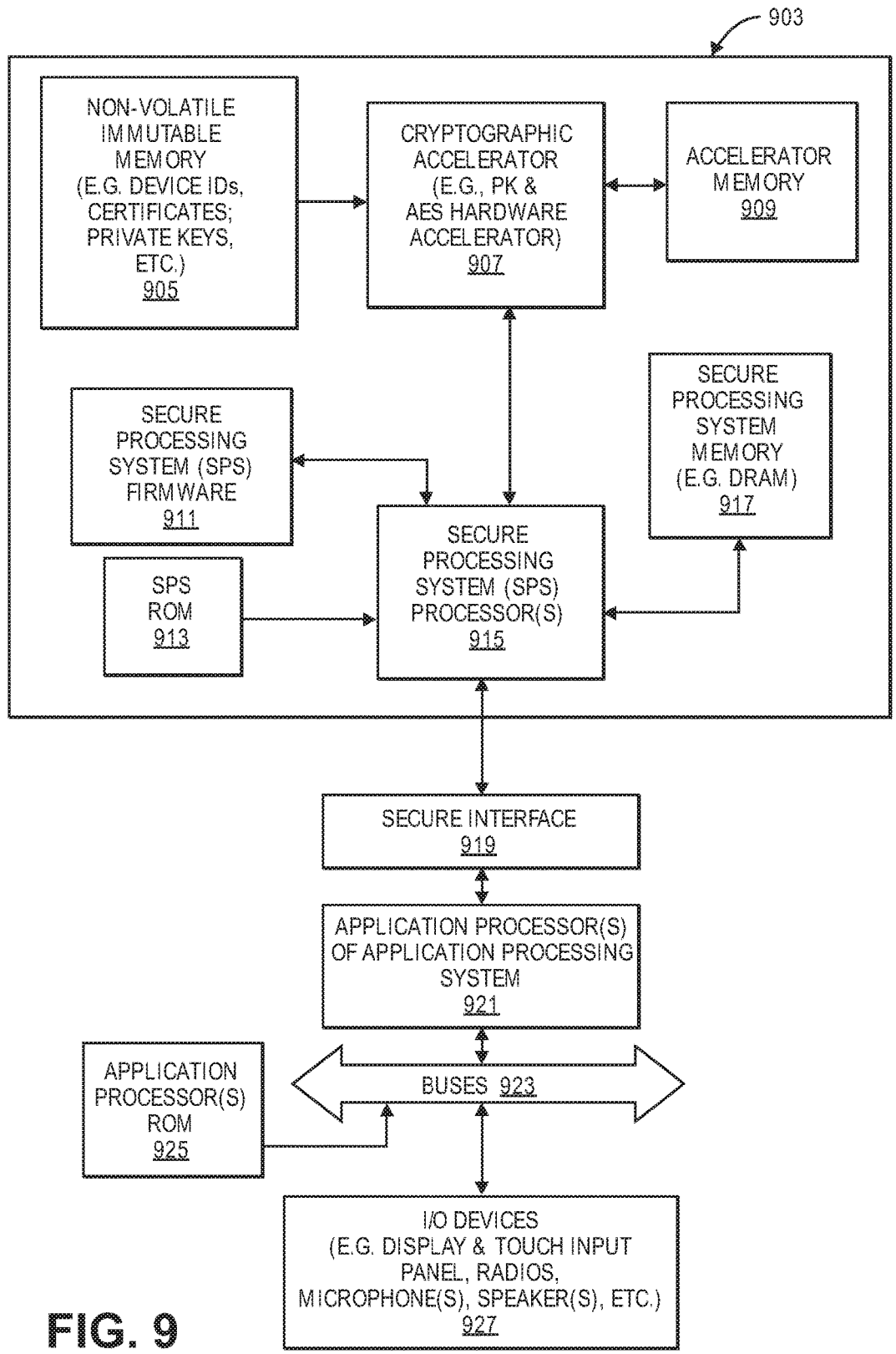
FIG. 9 shows an example of a data processing system which includes a secure processing system and an application processing system according to one embodiment described herein.

FIG. 9 shows an example of a system which includes a secure processing system (such as secure processing system 101 in FIG. 1) and an application processing system, such as application processing system 102. In one embodiment, a secure processing system can be a processing system that can securely store a long-term history within the secure processing system or securely store one or more keys that are used to encrypt and decrypt the long-term history while an encrypted version of the long-term history can be stored outside of the secure processing system. The secure processing system can be secure in one embodiment because an element in the secure processing system, such as memory within the secure processing system, is not accessible by components outside of the secure processing system. In one embodiment, the secure processing system 903 can be implemented as a system-on-chip. In another embodiment, the one or more application processors 921 and the secure processing system 903 can be implemented on a system-on-chip and include one or more processors and memory controllers and other components on a single integrated circuit. In the example shown in FIG. 9, the secure processing system 903 can perform, in addition to the operations of secure processing system 101, cryptographic operations such as encrypting user files or verifying code signatures or processing user passcodes or performing other security operations by executing the software stored as firmware 911 in the secure processing system 903. The firmware 911 can store executable program instructions which execute on the secure processing system processor 915 to provide the cryptographic operations or functions in addition to providing secure computing for display data such as long-term history 104. The secure processing system processor 915 can also be coupled to a secure processing system ROM 913 which can be trusted software that can validate the software in the firmware 911 before allowing that firmware to execute by checking a code signature of the firmware and verifying that the signature code indicates that the firmware is valid and has not been corrupted before allowing the firmware to be executed by the secure processing system processor 915. The secure processing system 903 can also include a cryptographic accelerator such as cryptographic accelerator 907 which can perform asymmetric cryptography as well as symmetric cryptography using a hardware accelerator. The accelerator 907 can be coupled to non-volatile and immutable memory 905 which can store in a secure manner a device identifier or a set of device identifiers and a set of one or more certificates and private keys which are hidden from the rest of the system (e.g., hidden from the application processing system 102) and are not readable by the rest of the system in one embodiment. The cryptographic accelerator 907 has access to the private keys and other data within the memory 905 and access to the memory 905 is not allowed for components outside of the secure processing system 903. The lack of access to memory 905 is one reason why the secure processing system 903 can be considered "secure." In one embodiment, the accelerator 907 can be coupled to an accelerator memory 909 which can be a scratch pad memory used to perform the cryptographic operations that are performed by the cryptographic accelerator 907. The system shown in FIG. 9 includes a secure interface 919 which can be an in-box and an out-box, in one embodiment, that allows a secure communication between the application processor(s) 921 and the secure processing system processor(s) 915. An example of a secure processing system, such as secure processing system 903, is described in published U.S. Patent Publication No. US 2014/0089682. The application processor(s) 921 can be coupled to one or more buses 923 which are coupled to one or more input and output devices 927, such as a touchscreen display (such as a touchscreen display coupled to display hardware 110 in FIG. 1) and a Bluetooth radio, other radios such as WiFi and NFC radios, cellular telephone radios, etc. The examples of the input and output devices 927 depend upon the device and can include other input or other output devices. The application processor(s) 921 is also coupled to an application processor ROM or read only memory 925 which provides software to boot up the application processor. Similarly, the secure processing system ROM 913 provides code to boot up the secure element processor 915. The secure processing system 903 can also include a secure processing system memory 917 such as volatile DRAM (dynamic random access memory) in which the long-term history 104 can be stored. In one embodiment, the secure processing system 903 and the secure interface 919 and the set of one or more application processor(s) 921 can be on a system-on-chip (or a set of chips) that forms the processors 1303 in FIG. 10. In one embodiment, the buses 923 can be part of the buses 1309, and the I/O (input/output) devices 927 can be part of the I/O devices 1317.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include server systems, desktop computers, laptop computers, tablet computers, smart phones, cellular telephones, personal digital assistants (PDAs), embedded electronic devices, or other consumer electronic devices.

Figure 10:
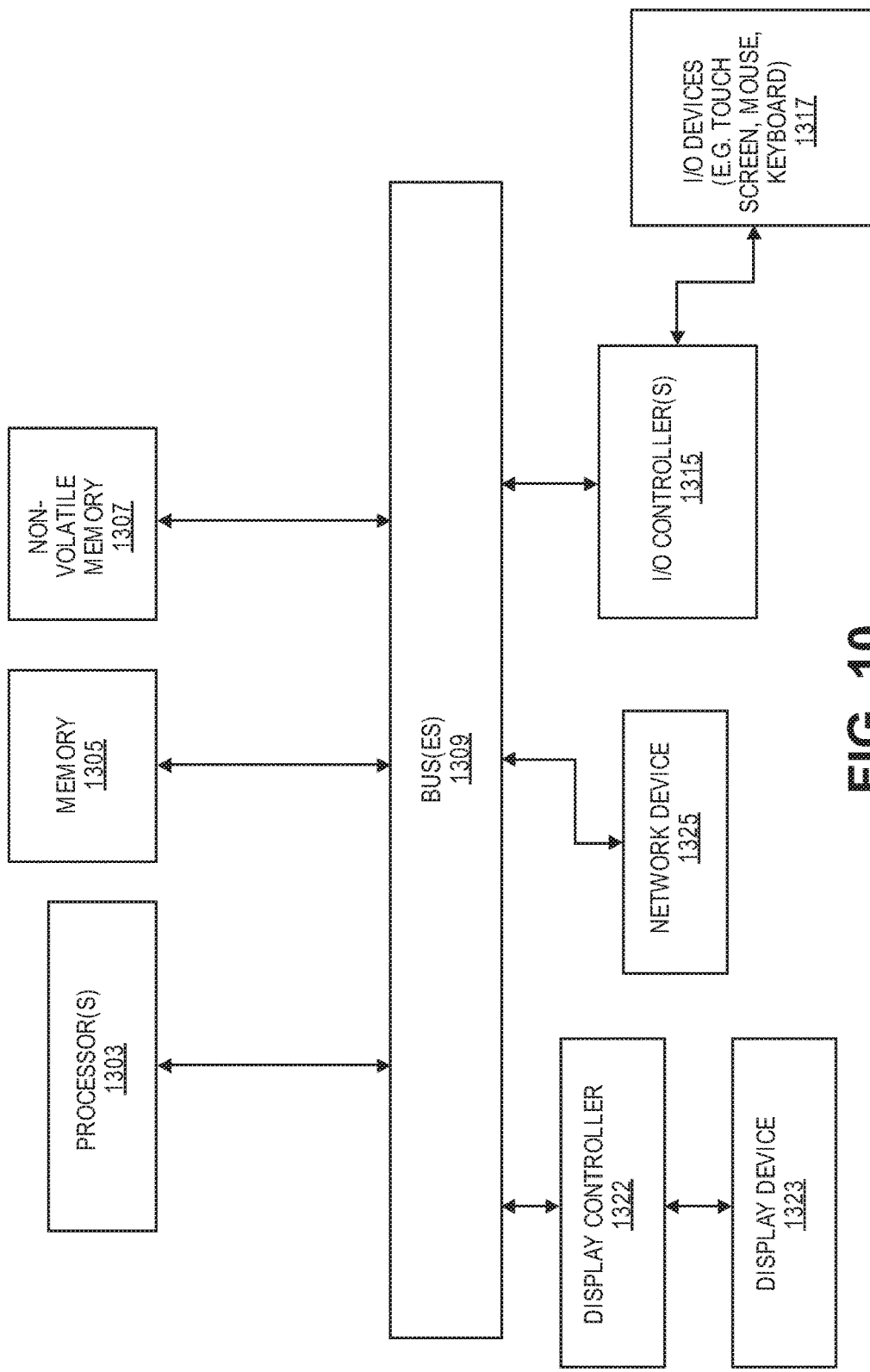
FIG. 10 shows an example of a data processing system which can include an application processing system according to one embodiment described herein and which can also include a secure processing system.

FIG. 10 is a block diagram of data processing system hardware according to an embodiment. Note that while FIG. 10 illustrates the various components of a data processing system that may be incorporated into a mobile or handheld device or other electronic device, it is not intended to represent any particular architecture or manner of interconnecting the components as such details are not germane to the present invention. It will also be appreciated that other types of data processing systems that have fewer components than shown or more components than shown in FIG. 10 can also be used with the present invention.

As shown in FIG. 10, the data processing system includes one or more buses 1309 that serve to interconnect the various components of the system. One or more processors 1303 are coupled to the one or more buses 1309 as is known in the art. Memory 1305 may be DRAM or non-volatile RAM or may be flash memory or other types of memory or a combination of such memory devices. This memory is coupled to the one or more buses 1309 using techniques known in the art. The data processing system can also include non-volatile memory 1307, which may be a hard disk drive or a flash memory or a magnetic optical drive or magnetic memory or an optical drive or other types of memory systems (e.g., ROM) that maintain data even after power is removed from the system. The non-volatile memory 1307 and the memory 1305 are both coupled to the one or more buses 1309 using known interfaces and connection techniques. A display controller 1322 is coupled to the one or more buses 1309 in order to receive display data to be displayed on a display device 1323. The display device 1323 can include an integrated touch input to provide a touch screen. The data processing system can also include one or more input/output (I/O) controllers 1315 which provide interfaces for one or more I/O devices, such as one or more mice, touch screens, touch pads, joysticks, and other input devices including those known in the art and output devices (e.g. speakers). The input/output devices 1317 are coupled through one or more I/O controllers 1315 as is known in the art.

While FIG. 10 shows that the non-volatile memory 1307 and the memory 1305 are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 1309 can be connected to each other through various bridges, controllers and/or adapters as is well known in the art. In one embodiment the I/O controller 1315 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 1325 can be coupled to the bus(es) 1309. The network device(s) 1325 can be wired network devices (e.g., Ethernet) or wireless network devices (e.g., WiFi, Bluetooth).

It will be apparent from this description that aspects of the present invention may be embodied, at least in part, in software. That is, the techniques may be carried out in a data processing system in response to its processor executing a sequence of instructions contained in a storage medium, such as a non-transitory machine-readable storage medium (e.g. volatile DRAM or non-volatile flash memory). In various embodiments, hardwired circuitry may be used in combination with software instructions to implement the present invention. Thus the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), speaker systems with integrated computing capabilities, handheld devices (e.g., smartphones), as well as embedded systems suitable for use in wearable electronic devices.

The present disclosure recognizes that the use of personal information data (such as burn-in statistics or burn-in snapshots which may reveal images displayed on a display), in the present technology, can be used to the benefit of users. For example, the personal information data can be used to mitigate burn-in effect on a display, thereby improving the effective lifetime of a display. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services. In another example, users can select a partial opt-in in which the data is collected only when certain applications are used, etc.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable instructions which when executed by a data processing system cause the data processing system to perform a method comprising:
   storing, in memory, a plurality of snapshots over time of data representing display intensity for each pixel in a plurality of pixels in a display, the plurality of pixels displaying one or more images on the display;
   accumulating, in an accumulation buffer, the plurality of snapshots to provide an accumulated value for each pixel in the plurality of pixels;
   flushing the accumulated value for each pixel in the plurality of pixels from the accumulation buffer to memory in a secure processing system and clearing the accumulated values from the accumulation buffer after the flushing;
   adding the accumulated value for each pixel in the plurality of pixels to a long-term history stored in the memory in the secure processing system, the long-term history storing, for each pixel in the plurality of pixels, a long-term display intensity and wherein the secure processing system has one or more private keys and one or more device identifiers, stored in secure memory in the secure processing system, that are not accessible to an application processing system that is coupled to the secure processing system, and wherein the secure processing system verifies code signatures at boot up time of the data processing system and verifies a user to unlock the data processing system from a locked state.

2. The medium as in claim 1 wherein the plurality of pixels in the display includes all of the pixels in the display that are used to display the one or more images.

3. The medium as in claim 1 wherein each of the snapshots has a first number of bits per pixel and each accumulated value has a second number of bits per pixel, the second number being greater than the first number.

4. The medium as in claim 1 wherein the long-term display intensity for each pixel is used to create a compensation value for each pixel to mitigate a burn-in effect on the display.

5. The medium as in claim 4 wherein the burn-in effect dims the maximum brightness of at least some of the pixels.

6. The medium as in claim 1 wherein the long-term history is encrypted by the secure processing system and the encrypted long-term history is stored in non-volatile memory in a file system maintained by an application processing system.

7. The medium as in claim 6 wherein the long-term history, once stored in memory in the secure processing system, is not accessible to the application processing system without authorization from the secure processing system and wherein the secure processing system includes one or more non-extractable device private keys.

8. The medium as in claim 1 wherein the accumulated value for each pixel is stored unencrypted in the accumulation buffer and wherein the plurality of snapshots are stored in DRAM and the accumulation buffer is in DRAM.

9. The medium as in claim 1 wherein the long-term history provides a long-term display intensity for each pixel of the display over the entire lifetime of use of the display, and wherein each of the snapshots is captured and stored once per first time period and wherein the accumulation buffer is flushed once per second time period which is at least 5 times greater than the first time period, and wherein using the accumulation buffer to accumulate a set of snapshots before adding to the long-term history reduces the number of wake ups from sleep or low power state for the secure processing system during the second period of time.

10. The medium as in claim 9 wherein the first time period is less than 5 seconds and the second time period is less than 5 minutes and wherein the snapshots of data include data representing thermal information about the display.

11. A data processing system comprising:
   a frame buffer to store image data for display;
   a display having a plurality of pixels, the display coupled to the frame buffer;
   a first memory to store a plurality of snapshots, taken over time, of data representing display intensity for each pixel in the plurality of pixels;
   a second memory to store an accumulation buffer that stores an accumulated value for each pixel in the plurality of pixels, each accumulated value derived by accumulating the display intensities from the plurality of snapshots for the same pixel;
   a first processing system coupled to the frame buffer and to the first memory and to the second memory, the first processing system configured to accumulate the display intensities from the plurality of snapshots;
   a second processing system coupled to the first processing system, the second processing system including a secure memory, the second processing system to add the accumulated value for each pixel in the plurality of pixels to a long-term history stored in the secure memory after the first processing system is to flush the accumulated value for each pixel in the plurality of pixels, the long-term history storing, for each pixel in the plurality of pixels, a long-term display intensity; and wherein the second processing system is a secure processing system which has one or more private keys and one or more device identifiers, stored in secure memory in the secure processing system, that are not accessible to the second processing system which is an application processing system that is coupled to the secure processing system, and wherein the secure processing system verifies code signatures at boot up time of the data processing system and verifies a user to unlock the data processing system from a locked state.

12. The data processing system as in claim 11, wherein the plurality of pixels in the display includes all of the pixels in the display that are used to display one or more images on the display.

13. The data processing system as in claim 11 wherein each of the snapshots has a first number of bits per pixel allocated for each snapshot and each accumulated value has a second number of bits per pixel allocated, and the second number is greater than the first number.

14. The data processing system as in claim 11 wherein the long-term display intensity for each pixel is used to create a compensation value for each pixel to mitigate a burn-in effect on the display and wherein the burn-in effect dims the maximum brightness of a least some pixels.

15. The data processing system as in claim 11 wherein the long-term history is encrypted by the second processing system which is a secure processing system and the encrypted long-term history is stored in non-volatile memory in a file system maintained by the first processing system which is an application processing system.

16. The data processing system as in claim 15 wherein the long-term history, once stored in memory in the secure processing system, is not accessible to the application processing system without authorization from the secure processing system.

17. The system as in claim 11 wherein the long-term history provides a long-term display intensity for each pixel of the display over the entire lifetime of use of the display, and wherein each of the snapshots is captured and stored once per first time period and wherein the accumulation buffer is flushed once per second time period which is at least 5 times greater than the first time period, and wherein using the accumulation buffer to accumulate a set of snapshots before adding to the long-term history reduces the number of wake ups from sleep or low power state for the second processing system during the second period of time.

18. The system as in claim 17 wherein the first time period is less than 5 seconds and the second time period is less than 5 minutes and wherein the snapshots of data include data representing thermal information about the display.

* * * * *